US008867114B2

(12) United States Patent
Kanno et al.

(10) Patent No.: US 8,867,114 B2
(45) Date of Patent: Oct. 21, 2014

(54) VIBRATING MIRROR ELEMENT

(75) Inventors: Isaku Kanno, Kobe (JP); Hidetoshi Kotera, Kyoto (JP); Manabu Murayama, Osaka (JP); Naoki Inoue, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 296 days.

(21) Appl. No.: 13/520,411

(22) PCT Filed: Dec. 24, 2010

(86) PCT No.: PCT/JP2010/073305
§ 371 (c)(1),
(2), (4) Date: Jul. 3, 2012

(87) PCT Pub. No.: WO2011/083701
PCT Pub. Date: Jul. 14, 2011

(65) Prior Publication Data
US 2012/0320441 A1    Dec. 20, 2012

(30) Foreign Application Priority Data

Jan. 5, 2010   (JP) .................................. 2010-000693

(51) Int. Cl.
*G02B 26/08*   (2006.01)
(52) U.S. Cl.
CPC .................................. *G02B 26/0841* (2013.01)
USPC ...................................................... 359/224.1
(58) Field of Classification Search
CPC .............. G02B 26/08; G02B 26/0808; G02B 26/0825; G02B 26/0833; G02B 26/0841
USPC .................................. 359/199.1, 223.1–226.1
See application file for complete search history.

(56) References Cited

U.S. PATENT DOCUMENTS

| 6,327,855 | B1 | 12/2001 | Hill et al. |
| 6,657,764 | B1 | 12/2003 | Smits |

(Continued)

FOREIGN PATENT DOCUMENTS

| CN | 102695978 A | 9/2012 |
| JP | 2002-539496 A | 11/2002 |

(Continued)

OTHER PUBLICATIONS

Tani, et al., A Two-Axis Piezoelectic Tilting Micromirror with a Newly Developed PZT-Meandering Acutator, MEMS 2007—20th IEEE International Conference on Micro Electro Mechnical Systems, Jan. 21-25, 2007, pp. 699-702, Kobe, Japan.

(Continued)

*Primary Examiner* — Euncha Cherry
(74) *Attorney, Agent, or Firm* — Baker & Hostetler LLP

(57) ABSTRACT

This vibrating mirror element (100) includes a mirror portion (10), a first driving portion (41), being cantilevered, including a first fixed end (41*a*) formed on a first side of a first direction and a first free end (41*b*) formed on a second side thereof, and linearly extending, a first mirror support portion (46) capable of supporting the mirror portion (10) in an inclined state, a second driving portion (51), being cantilevered, including a second fixed end (51*a*) formed on the second side of the first direction and a second free end (51*b*) formed on the first side thereof, being point-symmetrical to the first driving portion with respect to the center of a mirror, and linearly extending, and a second mirror support portion (56) being point-symmetrical to the first mirror support portion with respect to the center of the mirror and capable of supporting the mirror portion in an inclined state.

20 Claims, 9 Drawing Sheets

(56) References Cited

U.S. PATENT DOCUMENTS

| | | |
|---|---|---|
| 6,718,764 B1 | 4/2004 | Sarkar et al. |
| 6,830,944 B1 | 12/2004 | Smits |
| 7,515,323 B2 | 4/2009 | Mizoguchi |
| 2007/0158552 A1 | 7/2007 | Kim et al. |
| 2008/0225363 A1* | 9/2008 | Saitoh et al. .................. 359/199 |
| 2010/0149615 A1 | 6/2010 | Kotera et al. |
| 2011/0032590 A1 | 2/2011 | Terada et al. |
| 2012/0033279 A1 | 2/2012 | Furukawa et al. |
| 2012/0320440 A1 | 12/2012 | Kotera et al. |

FOREIGN PATENT DOCUMENTS

| | | | |
|---|---|---|---|
| JP | 2003181800 A | 7/2003 | |
| JP | 2007188073 A | 7/2007 | |
| JP | 2008040240 A | 2/2008 | |
| JP | 2008102362 A | 5/2008 | |
| JP | 2008249858 A | 10/2008 | |
| JP | 2008257226 A | 10/2008 | |
| JP | 2009169290 A | 7/2009 | |
| JP | 2010139977 A | 6/2010 | |
| WO | 0055666 A1 | 9/2000 | |
| WO | 2009013902 A1 | 10/2009 | |
| WO | 2009130902 A1 | 10/2009 | |
| WO | 2010131449 A1 | 11/2010 | |
| WO | 2010131556 A1 | 11/2010 | |

OTHER PUBLICATIONS

International Search Report and Written Opinion for PCT/JP2010/073305, international filing date of Dec. 24, 2010, mailed on Apr. 5, 2011.

* cited by examiner

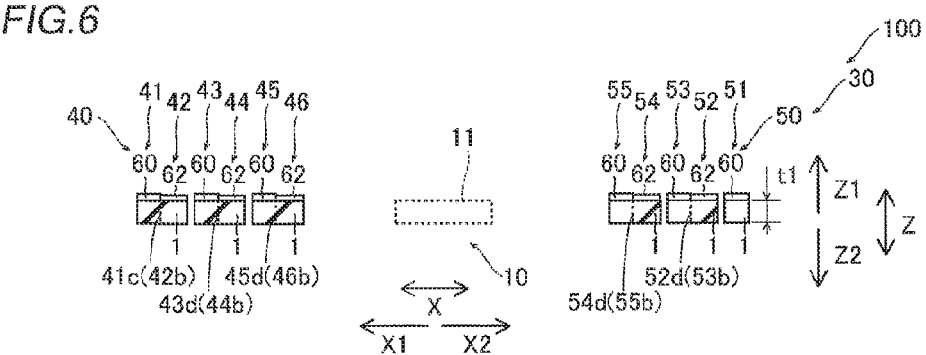
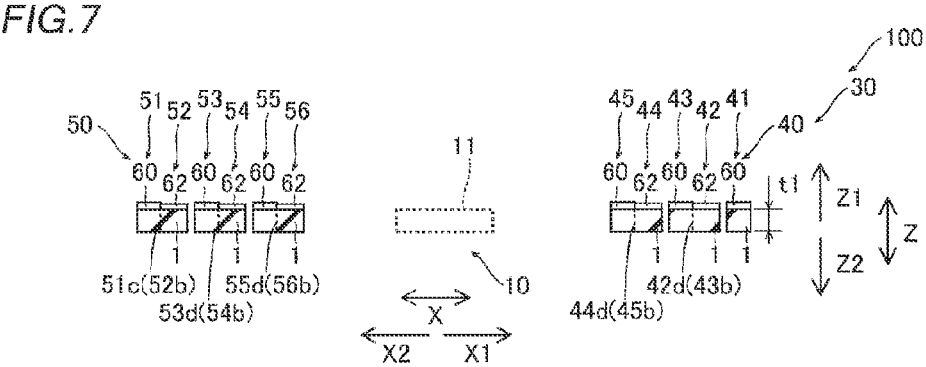
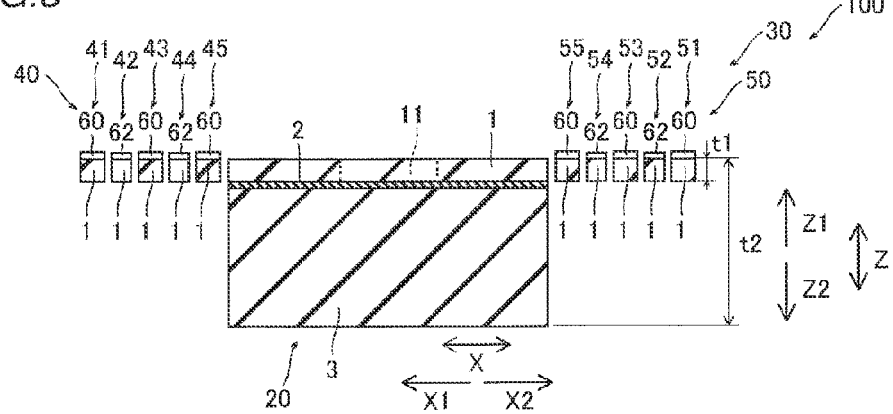

VIBRATING MIRROR ELEMENT

CROSS-REFERENCE TO RELATED APPLICATIONS

The present application is a national stage entry of PCT/JP2010/0073305, filed Dec. 24, 2010, which claims the benefit of Japanese Application Serial No. 2010-000693, filed Jan. 5, 2010.

TECHNICAL FIELD

The present invention relates to a vibrating mirror element, and more particularly, it relates to a vibrating mirror element including a driving portion.

BACKGROUND ART

In general, a vibrating mirror element including a driving portion is known. Such a vibrating mirror element is disclosed in Japanese Patent Laying-Open Nos. 2009-169290 and 2007-188073, for example.

In the aforementioned Japanese Patent Laying-Open No. 2009-169290, there is disclosed an optical deflector including a pair of driving portions arranged along a direction X, a mirror portion arranged to be held between this pair of driving portions in the direction X and rotated by the pair of driving portions, and a support portion arranged to surround the pair of driving portions and the mirror portion along the direction X and a direction Y (direction orthogonal to the direction X in the same plane). First end portions of this pair of driving portions are connected with the mirror portion on a first side of the direction X and a second side thereof, respectively. Second end portions of the pair of driving portions are fixed by the support portion located on sides opposite to the mirror portion in the direction X. The pair of driving portions are arranged such that a plurality of piezoelectric actuators extending in the direction Y are arranged in the direction X, and the plurality of piezoelectric actuators are continuously connected in a state where end portions of the plurality of piezoelectric actuators are bent. The first end portions of the pair of driving portions of this optical deflector are connected with the mirror portion on corners of the mirror portion on a first side of the direction Y while the second end portions of the pair of driving portions are connected with the support portion on corners of the support portion on the first side of the direction Y.

In the aforementioned Japanese Patent Laying-Open No. 2007-188073, there is disclosed a two-axis micro scanner including a horizontal driving portion, a pair of first cantilevers arranged on a first side of the horizontal driving portion in a direction X and extending in the direction X, a pair of second cantilevers arranged on a second side of the horizontal driving portion in the direction X and extending in the direction X, a pair of first connectors connecting each of the pair of first cantilevers and the horizontal driving portion, a pair of second connectors connecting each of the pair of second cantilevers and the horizontal driving portion, and a frame arranged to surround the aforementioned all components along the direction X and a direction Y. The pair of first cantilevers and the pair of second cantilevers of this two-axis micro scanner are fixed to the frame on sides opposite to the first connectors and the second connectors, respectively, in the direction X. One of the pair of first cantilevers and one of the pair of second cantilevers are arranged on a first straight line extending in the direction X while the other of the pair of first cantilevers and the other of the pair of second cantilevers are arranged on a second straight line extending in the direction X.

PRIOR ART

Patent Document

Patent Document 1: Japanese Patent Laying-Open No. 2009-169290
Patent Document 2: Japanese Patent Laying-Open No. 2007-188073

SUMMARY OF THE INVENTION

Problems to be Solved by the Invention

However, in the optical deflector described in the aforementioned Patent Laying-Open No. 2009-169290, the first end portions and the second end portions of the pair of driving portions are connected with the mirror portion and the support portion in positions (the corners of the mirror portion and the corners of the support portion) deviating to the first side of the direction Y with respect to the center of the mirror portion, and hence there is such a problem that the mirror portion is so inclined that a second side of the mirror portion in the direction X is located below a first side of the mirror portion in the direction X due to the own weight of the mirror portion in a state where the pair of driving portions are not driven (non-driven state).

In the two-axis micro scanner described in the aforementioned Japanese Patent Laying-Open No. 2007-188073, one of the pair of first cantilevers and one of the pair of second cantilevers are arranged on the first straight line extending in the direction X while the other of the pair of first cantilevers and the other of the pair of second cantilevers are arranged on the second straight line extending in the direction X, and hence there is such a problem that the size of the two-axis micro scanner is increased in the direction X (first direction) by the total of the increased length of the pair of first cantilevers and the increased length of the pair of second cantilevers when the length of the pair of first cantilevers in the direction X and the length of the pair of second cantilevers in the direction X are increased in order to improve driving force.

The present invention has been proposed in order to solve the aforementioned problems, and an object of the present invention is to provide a vibrating mirror element capable of being inhibited from lengthening in a first direction and capable of inhibiting a mirror portion from inclining in a non-driven state.

Means for Solving the Problems and Effects of the Invention

A vibrating mirror element according to an aspect of the present invention includes a mirror portion, a deformable first driving portion, being cantilevered, including a first fixed end formed on a first side of a first direction beyond a first end portion of the mirror portion on the first side of the first direction and a first free end formed on a second side of the first direction beyond a second end portion of the mirror portion on the second side of the first direction, and linearly extending along the first direction, a first mirror support portion capable of supporting the mirror portion in a state where the mirror portion is inclined in response to an inclination of the first free end in driving, a deformable second driving portion, being cantilevered, including a second fixed end formed on the second side of the first direction beyond the second end portion of the mirror portion on the second side of the first direction and a second free end formed on the first side of the first direction beyond the first end portion of the mirror portion on the first side of the first direction, being point-symmetrical to the first driving portion with respect to the center of the mirror portion, and linearly extending along the first direction, and a second mirror support portion being point-symmetrical to the first mirror support portion with respect to the center of the mirror portion and capable of supporting the mirror portion in a state where the mirror portion is inclined in response to an inclination of the second free end in driving.

In the vibrating mirror element according to the aspect of the present invention, as hereinabove described, the second driving portion is configured to be point-symmetrical to the first driving portion with respect to the center of the mirror portion, and the second mirror support portion is configured to be point-symmetrical to the first mirror support portion with respect to the center of the mirror portion, whereby the mirror portion can be supported by the first driving portion and the second driving portion that are point-symmetrical to each other and the first mirror support portion and the second mirror support portion that are point-symmetrical to each other in plan view. Thus, the own weight of the mirror portion can be evenly distributed to the first mirror support portion and the second mirror support portion, and hence the mirror portion can be inhibited from inclining in a non-driven state. Furthermore, the first driving portion and the second driving portion are point-symmetrical to each other so that the residual stress of the first driving portion and the residual stress of the second driving portion can offset each other, if residual stress is accumulated in the first driving portion and the second driving portion. Thus, the mirror portion can be inhibited from inclining in the non-driven state also according to this structure.

Furthermore, in the aforementioned vibrating mirror element according to the aspect of the present invention, the first fixed end of the first driving portion linearly extending along the first direction is formed on the first side of the first direction beyond the first end portion of the mirror portion on the first side of the first direction, the first free end thereof is formed on the second side of the first direction beyond the second end portion of the mirror portion on the second side of the first direction, the second fixed end of the second driving portion linearly extending along the first direction is formed on the second side of the first direction beyond the second end portion of the mirror portion on the second side of the first direction, and the second free end thereof is formed on the first side of the first direction beyond the first end portion of the mirror portion on the first side of the first direction, whereby the first driving portion and the second driving portion can be formed to extend from a first side of the mirror portion in the first direction toward a second side thereof. In other words, the first driving portion and the second driving portion can be aligned in a direction (second direction) orthogonal to the first direction to hold the mirror portion therebetween in the second direction. Thus, the first driving portion and the second driving portion are not arranged on a common straight line extending in the first direction, and hence the overall size of the vibrating mirror element is not increased in the first direction by the sum of increases in the lengths of the first driving portion and the second driving portion even if the lengths of the first driving portion and the second driving portion in the first direction are increased. Consequently, the size of the vibrating mirror element in the first direction can be inhibited from increase.

Preferably in the aforementioned vibrating mirror element according to the aspect, residual stress is accumulated in the first driving portion and the second driving portion, and the residual stress of the first driving portion and the residual stress of the second driving portion being point-symmetrical to the first driving portion with respect to the center of the mirror portion offset each other, so that the mirror portion is arranged parallel to a plane passing through the first fixed end of the first driving portion and the second fixed end of the second driving portion in the non-driven state of the first driving portion and the second driving portion. According to this structure, the mirror portion can be easily inhibited from inclining with respect to the plane passing through the first fixed end of the first driving portion and the second fixed end of the second driving portion in the non-driven state even if residual stress is accumulated in the first driving portion and the second driving portion.

Preferably in the aforementioned vibrating mirror element according to the aspect, the first driving portion further includes a first connecting portion formed on the side of the first free end, the second driving portion further includes a second connecting portion formed on the side of the second free end, and the first mirror support portion is configured to be capable of supporting the mirror portion in a state where the mirror portion is inclined in response to an inclination of the first connecting portion while the second mirror support portion is configured to be capable of supporting the mirror portion in a state where the mirror portion is inclined in response to an inclination of the second connecting portion. According to this structure, the first mirror support portion can support the mirror portion while at least the inclination of the first connecting portion is maintained, and the second mirror support portion can support the mirror portion while at least the inclination of the second connecting portion is maintained.

Preferably in the aforementioned vibrating mirror element according to the aspect, the first mirror support portion, the second mirror support portion, and the mirror portion are configured to be located on the same plane in an inclined state when the first driving portion and the second driving portion are driven while being deformed. According to this structure, the mirror portion can be stably inclined while the inclination of the first mirror support portion inclined in response to the inclination of the first driving portion, the inclination of the second mirror support portion inclined in response to the inclination of the second driving portion, and the inclination of the mirror portion are maintained to be the same as each other.

Preferably in the aforementioned vibrating mirror element according to the aspect, the first driving portion and the second driving portion are configured to be deformed in warping directions opposite to each other to be driven. According to this structure, in the structure in which the first mirror support portion and the second mirror support portion are arranged to be point-symmetrical to each other, the first mirror support portion inclined in response to the deformation of the first driving portion and the second mirror support portion inclined in response to the deformation of the second driving portion can be easily inclined in the same direction, and hence the mirror portion supported by the first mirror support portion and the second mirror support portion can be easily inclined in a prescribed direction.

Preferably in the aforementioned vibrating mirror element according to the aspect, the first driving portion and the second driving portion are configured to be driven by voltage application, and voltages opposite in phase to each other are applied to the first driving portion and the second driving portion. According to this structure, the first driving portion and the second driving portion can be easily deformed to warp in directions different from each other. Thus, the first free end of the first driving portion and the second free end of the second driving portion can be displaced to the same extent in directions opposite to each other with reference to positions thereof in the non-driven state. Consequently, the first mirror support portion inclined in response to the inclination of the first free end of the first driving portion and the second mirror support portion being point-symmetrical to the first mirror support portion and inclined in response to the inclination of the second free end of the second driving portion can be inclined at substantially the same inclination angle. Therefore, the mirror portion supported by the first mirror support portion and the second mirror support portion can be inclined in the prescribed direction.

Preferably, the aforementioned vibrating mirror element according to the aspect further includes at least one deformable third driving portion arranged between the first driving portion and the first mirror support portion and linearly extending along the first direction, an inclinable first support portion, the number of which is equal to the number of the third driving portions, arranged between the first driving portion and the first mirror support portion and linearly extending along the first direction, a deformable fourth driving portion being point-symmetrical to the third driving portion with respect to the center of the mirror portion, arranged between the second driving portion and the second mirror support portion, and linearly extending along the first direction, and an inclinable second support portion being point-symmetrical to the first support portion with respect to the center of the mirror portion, arranged between the second driving portion and the second mirror support portion, and linearly extending along the first direction. According to this structure, the overall vibrating mirror element further including the third driving portion, the first support portion, the fourth driving portion, and the second support portion can be configured to be point-symmetrical, and hence the first mirror support portion and the second mirror support portion being point-symmetrical to the first mirror support portion with respect to the center of the mirror portion can equally support the mirror portion. Furthermore, in addition to the first driving portion and the second driving portion, the third driving portion and the fourth driving portion are driven, whereby the mirror portion can be inclined to have a larger inclination angle in driving.

Preferably in this case, the first mirror support portion, the second mirror support portion, the first support portion, and the second support portion are configured to be applied with no voltage and to be unwarped by the absence of a voltage. According to this structure, the first mirror support portion, the second mirror support portion, the first support portion, and the second support portion can maintain inclination angles without warping.

Preferably in the aforementioned structure further including the third driving portion and the fourth driving portion, the first driving portion, the second driving portion, the third driving portion, and the fourth driving portion are configured to be driven by voltage application, and a voltage applied to the first driving portion and the third driving portion and a voltage applied to the second driving portion and the fourth driving portion are opposite in phase to each other. According to this structure, the first and third driving portions and the second and fourth driving portions can be easily deformed to warp in directions different from each other. Thus, the first free end of the first driving portion and the second free end of the second driving portion can be displaced to the same extent in the directions opposite to each other with reference to the positions thereof in the non-driven state. Furthermore, the third driving portion and the fourth driving portion can be displaced to the same extent in directions opposite to each other with reference to positions thereof in a non-driven state. Consequently, the first mirror support portion and the second mirror support portion being point-symmetrical to the first mirror support portion can be inclined at substantially the same inclination angle. Therefore, the mirror portion supported by the first mirror support portion and the second mirror support portion can be easily inclined to have a large inclination angle in the prescribed direction.

Preferably in the aforementioned structure further including the third driving portion and the fourth driving portion, the third driving portion and the first support portion are connected to each other by alternately successively bending adjacent portions on either the first side of the first direction or the second side thereof in a state where the third driving portion and the first support portion are alternately arranged from the side of the first mirror support portion toward the side of the first driving portion along the second direction orthogonal to the first direction, so that portions from the first mirror support portion to the first driving portion are continuously connected, and the fourth driving portion and the second support portion are connected to each other by alternately successively bending adjacent portions on either the first side of the first direction or the second side thereof in a state where the fourth driving portion and the second support portion are alternately arranged from the side of the second mirror support portion toward the side of the second driving portion along the second direction, so that portions from the second mirror support portion to the second driving portion are continuously connected. According to this structure, the third driving portion can be driven on the basis of the displacement of the connecting portion of the first driving portion and the first support portion while the fourth driving portion can be driven on the basis of the displacement of the connecting portion of the second driving portion and the second support portion, and hence the inclination angles of the first mirror support portion and the second mirror support portion can be further increased. Thus, the inclination angle of the mirror portion can be further increased.

Preferably in the aforementioned vibrating mirror element including the third driving portion, the first support portion, the fourth driving portion, and the second support portion, the first driving portion further includes a first connecting portion formed on the side of the first free end, the second driving portion further includes a second connecting portion formed on the side of the second free end, the third driving portion includes a third connecting portion connected with the first support portion or the first mirror support portion adjacent thereto on a side closer to the mirror portion in the second direction, the fourth driving portion includes a fourth connecting portion connected with the second support portion or the second mirror support portion adjacent thereto on a side closer to the mirror portion in the second direction, the first driving portion is configured to be connected with the first support portion adjacent thereto on the first connecting portion while the second driving portion is configured to be connected with the second support portion adjacent thereto on the second connecting portion, the inclination angle of the first mirror support portion with respect to the tangent line of the first fixed end of the first driving portion is the sum of the inclination angle of the first connecting portion with respect to the tangent line of the first fixed end of the first driving portion and the inclination angle of the third connecting portion of the third driving portion with respect to the first support portion adjacently located on a side closer to the first driving portion in the second direction, and the inclination angle of the second mirror support portion with respect to the tangent line of the second fixed end of the second driving portion is the sum of the inclination angle of the second connecting portion with respect to the tangent line of the second fixed end of the second driving portion and the inclination angle of the fourth connecting portion of the fourth driving portion with respect to the second support portion adjacently located on a side closer to the second driving portion in the second direction. According to this structure, the inclination angle of the first mirror support portion with respect to the tangent line of the first fixed end can be obtained by adding the inclination angle based on the first driving portion and the inclination angle based on the third driving portion while the inclination angle of the second mirror support portion with respect to the tangent line of the second fixed end can be obtained by adding the inclination angle based on the second driving portion and the inclination angle based on the fourth driving portion, and hence the inclination angles of the first mirror support portion and the second mirror support portion can be further increased. Thus, the inclination angle of the mirror portion can be further increased.

Preferably in this case, the third driving portion includes a fifth connecting portion connected with the first support portion adjacent thereto on the side closer to the first driving portion in the second direction, the fourth driving portion includes a sixth connecting portion connected with the second support portion adjacent thereto on the side closer to the second driving portion in the second direction, when the third driving portion is applied with a voltage to be driven, the first support portion is undeformed, and the third driving portion is deformed with reference to the fifth connecting portion, and when the fourth driving portion is applied with a voltage to be driven, the second support portion is undeformed, and the fourth driving portion is deformed with reference to the sixth connecting portion. According to this structure, the third driving portion (fourth driving portion) can be deformed with reference to the fifth connecting portion (sixth connecting portion) to be further inclined with respect to the tangent line of the first fixed end of the first driving portion (second fixed end of the second driving portion). Thus, the inclination angles of the first mirror support portion and the second mirror support portion can be easily further increased. Consequently, the inclination angle of the mirror portion can be further increased.

Preferably in the aforementioned structure in which the third driving portion and the fourth driving portion include the third connecting portion and the fourth connecting portion, respectively, the inclination angle of the first connecting portion with respect to the tangent line of the first fixed end of the first driving portion is equal to the inclination angle of the second connecting portion with respect to the tangent line of the second fixed end of the second driving portion, and the inclination angle of the third connecting portion of the third driving portion with respect to the first support portion adjacently located on the side closer to the first driving portion in the second direction is equal to the inclination angle of the fourth connecting portion of the fourth driving portion with respect to the second support portion adjacently located on the side closer to the second driving portion in the second direction. According to this structure, the sum of the inclination angle of the first connecting portion with respect to the tangent line of the first fixed end of the first driving portion and the inclination angle of the third connecting portion of the third driving portion with respect to the first support portion adjacently located on the side closer to the first driving portion in the second direction and the sum of the inclination angle of the second connecting portion with respect to the tangent line of the second fixed end of the second driving portion and the inclination angle of the fourth connecting portion of the fourth driving portion with respect to the second support portion adjacently located on the side closer to the second driving portion in the second direction can be rendered equal to each other. Thus, the inclination angle of the first mirror support portion and the inclination angle of the second mirror support portion can be rendered equal to each other.

Preferably in the aforementioned vibrating mirror element according to the aspect, the mirror portion is configured to rotate about a first rotation center axis, and the mirror portion includes a mirror and a fifth driving portion rotating the mirror about a second rotation center axis orthogonal to the first rotation center axis in the in-plane direction of the mirror. According to this structure, the mirror can accurately reflect light about the first rotation center, and the vibrating mirror element capable of two-dimensionally optically scanning an object can be obtained.

Preferably in this case, the first driving portion and the second driving portion are configured to rotate the mirror portion about the first rotation center axis on the basis of a first frequency, and the fifth driving portion is configured to rotate the mirror about the second rotation center axis on the basis of a second frequency larger than the first frequency. According to this structure, the vibrating mirror element can two-dimensionally optically scan the object while the mirror portion is configured to rotate at a larger frequency about the second rotation center axis than about the first rotation center axis.

Preferably in the aforementioned structure in which the mirror portion rotates about the first rotation center axis, the first rotation center axis passes through middle portions of the first driving portion and the second driving portion in the first direction in the non-driven state of the first driving portion and the second driving portion. According to this structure, the first driving portion and the second driving portion can be driven in the first direction in a balanced manner.

Preferably in the aforementioned structure in which the mirror portion rotates about the first rotation center axis, a pair of the fifth driving portions are provided to hold the mirror therebetween in the second direction orthogonal to the first direction, and formed to protrude toward the mirror in the vicinity of the first rotation center axis. According to this structure, the width of the fifth driving portion in the vicinity of the first rotation center axis is increased, and hence the mechanical strength of the fifth driving portion deformed in driving can be increased.

Preferably in the aforementioned structure in which the mirror portion rotates about the first rotation center axis, the mirror portion includes a frame body supported by the first mirror support portion and the second mirror support portion, and the frame body has a thickness larger than the thicknesses of other portions of the mirror portion. According to this structure, the mechanical strength of the frame body is increased, and hence the frame body can be inhibited from twisting. Consequently, the mirror portion can be inclined at a prescribed inclination angle in a stable state.

Preferably in the aforementioned vibrating mirror element according to the aspect, the first driving portion, the first mirror support portion, the second driving portion, the second mirror support portion, and the mirror portion are integrally formed. According to this structure, no connection between each portion may be made separately, and hence the number of steps of manufacturing the vibrating mirror element can be reduced.

Preferably in the aforementioned vibrating mirror element according to the aspect, each of the first driving portion and the second driving portion further includes a driving section having an electrode, an insulating layer formed on a surface of the driving section and having a contact hole, and a wiring portion formed to extend on a surface of the insulating layer and connected with the electrode of the driving section through the contact hole. According to this structure, a voltage can be easily applied to the electrode of the driving section of each of the first driving portion and the second driving portion through the wiring portion and the contact hole.

BRIEF DESCRIPTION OF THE DRAWINGS

FIG. 6 An enlarged sectional view of the vibrating mirror element taken along the line 3000-3000 shown in FIG. 2.

FIG. 7 An enlarged sectional view of the vibrating mirror element taken along the line 4000-4000 shown in FIG. 2.

FIG. 8 An enlarged sectional view of the vibrating mirror element taken along the line 5000-5000 shown in FIG. 2.

MODES FOR CARRYING OUT THE INVENTION

An Embodiment embodying the present invention is now described on the basis of the drawings.

First, the structure of a vibrating mirror element 100 according to the embodiment of the present invention is described with reference to FIGS. 1 to 9.

Figure 1:
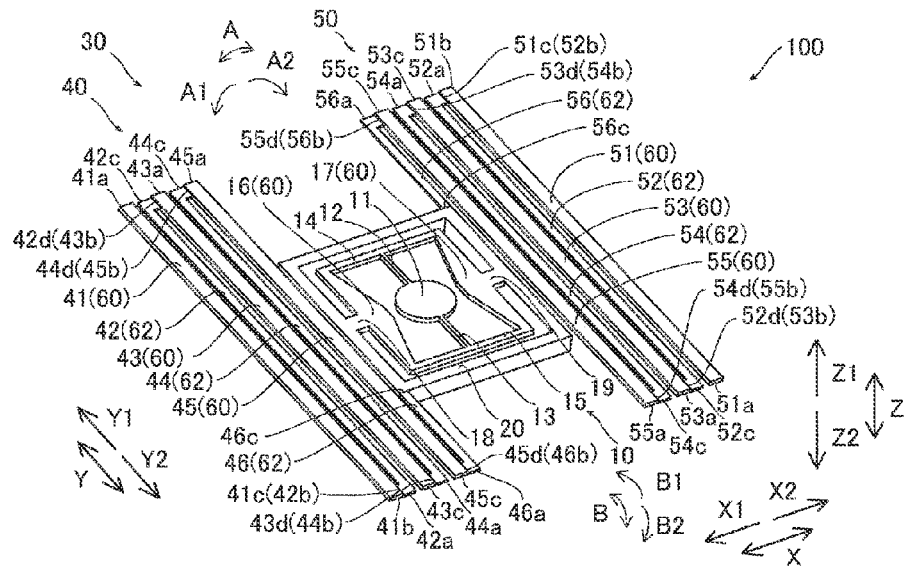
FIG. 1 A perspective view showing the structure of a vibrating mirror element according to an embodiment of the present invention.
Figure 2:
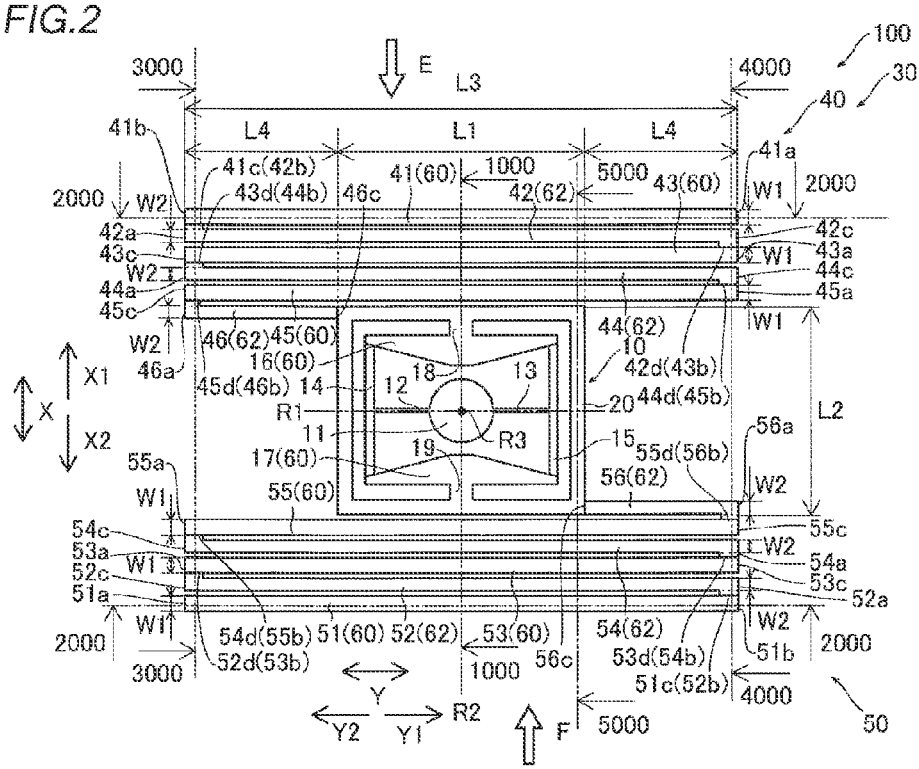
FIG. 2 A plan view showing the structure of the vibrating mirror element according to the embodiment of the present invention.
Figure 3:
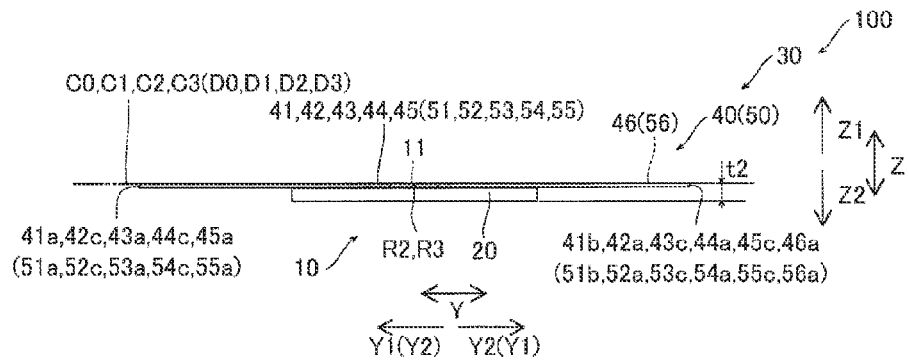
FIG. 3 A side elevational view of the vibrating mirror element shown in FIG. 2 as viewed in a direction E (direction F).

The vibrating mirror element 100 according to the embodiment of the present invention includes an X-directional optical scanning portion 10 to optically scan an object in a direction X with a mirror 11 described later and a Y-directional optical scanning portion 30 to optically scan an object in a direction Y orthogonal to the direction X with the mirror 11, as shown in FIGS. 1 to 3. The X-directional optical scanning portion 10 and the Y-directional optical scanning portion 30 are integrally formed on a common Si substrate 1 having a thickness t1 of about 0.1 mm, as shown in FIGS. 4 to 8. The X-directional optical scanning portion 10 is an example of the "mirror portion" in the present invention.

The vibrating mirror element 100 is built into a device optically scanning an object, such as an unshown projector, and configured to optically scan an object in the direction X with the X-directional optical scanning portion 10 and optically scan the object in the direction Y with the Y-directional optical scanning portion 30. The X-directional optical scanning portion 10 is configured to resonantly drive the mirror 11 at a resonance frequency of about 30 kHz, while the Y-directional optical scanning portion 30 is configured to nonresonantly drive the mirror 11 at a frequency of about 60 Hz. The Y-directional optical scanning portion 30 is so configured to nonresonantly drive the mirror 11 that there is no change in resonance frequency resulting from temperature change around the vibrating mirror element 100, whereby the same can stably drive the mirror 11 described later. The resonance frequency of about 30 kHz is an example of the "second frequency" in the present invention, and the frequency of about 60 Hz is an example of the "first frequency" in the present invention.

Figure 4:
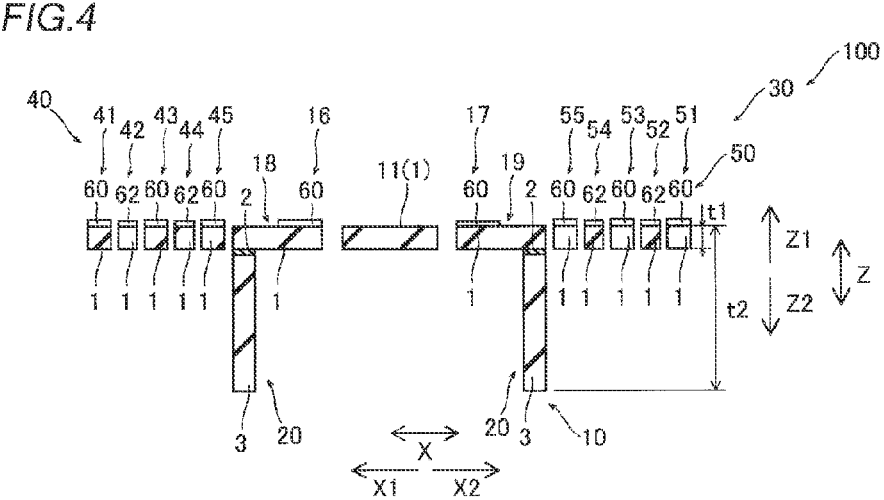
FIG. 4 An enlarged sectional view of the vibrating mirror element taken along the line 1000-1000 shown in FIG. 2.
Figure 5:
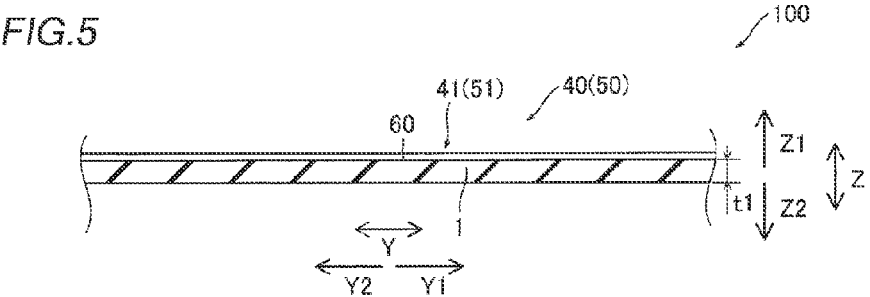
FIG. 5 An enlarged sectional view of the vibrating mirror element taken along the line 2000-2000 shown in FIG. 2.

As shown in FIGS. 4 and 8, while the X-directional optical scanning portion 10 and the Y-directional optical scanning portion 30 excluding a frame body 20 described later each have a thickness t1 of about 0.1 mm in a direction Z, the frame body 20 has a thickness t2 of about 0.5 mm larger than t1. In other words, the frame body 20 has a thickness larger than the thicknesses of other portions of the X-directional optical scanning portion 10. The frame body 20 is constituted by the Si substrate 1 having the thickness t1 of about 0.1 mm, a thin $SiO_2$ layer 2 formed on the lower surface (on a Z2 side) of the Si substrate 1, and a lower Si layer 3 having a thickness of about 0.4 mm formed on the lower surface of the $SiO_2$ layer 2.

The X-directional optical scanning portion 10 includes the mirror 11, torsionally deformable torsion bars 12 and 13 connected with the mirror 11, an inclinable bar 14 connected with the torsion bar 12, an inclinable bar 15 connected with the torsion bar 13, inner driving portions 16 and 17 connected with the bars 14 and 15, fixing portions 18 and 19 fixing the inner driving portions 16 and 17, and the frame body 20, as shown in FIGS. 1 and 2. The frame body 20 (X-directional optical scanning portion 10) has a length L1 of about 5 mm in the direction Y and a length L2 of about 4 mm in the direction X, as shown in FIG. 2. The inner driving portions 16 and 17 are examples of the "fifth driving portion" in the present invention.

The mirror 11 and the torsion bars 12 and 13 are configured to incline beyond inclinations of the bars 14 and 15 by resonance. The vibrating mirror element 100 is so configured that both a rotation center axis R1 for optically scanning the object in the direction X and a rotation center axis R2 for optically scanning the object in the direction Y pass through the center R3 of the mirror 11. This center R3 of the mirror 11 is located in the center of the X-directional optical scanning portion 10 in the directions X and Y. The rotation center axis R1 is an example of the "second rotation center axis" in the present invention, and the rotation center axis R2 is an example of the "first rotation center axis" in the present invention. The direction Y is an example of the "first direction" in the present invention, and the direction X is an example of the "second direction" in the present invention.

As shown in FIG. 1, the inner driving portions 16 and 17 are provided to hold the mirror 11 therebetween in the direction X. The inner driving portions 16 and 17 are configured to be concavely and convexly deformed in the direction Z employing the fixed portions 18 and 19 as fixed ends, respectively. The X-directional optical scanning portion 10 is configured to be capable of inclining the mirror 11 along arrow A1 or A2 about the rotation center axis R1 (see FIG. 2) by deforming the inner driving portions 16 and 17 in the directions opposite to each other. The X-directional optical scanning portion 10 is configured to vibrate the mirror 11 in a direction A about the rotation center axis R1 and to optically scan the object by repeating the deforming operation. The inner driving portions 16 and 17 are formed to protrude to the mirror 11 in the vicinity of the rotation center axis R1. The detailed structure of the inner driving portions 16 and 17 is described later.

The Y-directional optical scanning portion 30 includes a driving unit 40 formed on the X1 side of the X-directional optical scanning portion 10 and a driving unit 50 formed on the X2 side of the X-directional optical scanning portion 10, as shown in FIG. 2. In other words, the driving units 40 and 50 are arranged to hold the X-directional optical scanning portion 10 therebetween in the direction X.

According to this embodiment, in the driving unit 40, a driving portion 41, a support portion 42, a driving portion 43, a support portion 44, a driving portion 45, and a mirror support portion 46 are arranged in this order from an X1 side toward an X2 side along the direction X. In the driving unit 50, a driving portion 51, a support portion 52, a driving portion 53, a support portion 54, a driving portion 55, and a mirror support portion 56 are arranged in this order from the X2 side toward the X1 side along the direction X. The driving portion 41, the support portion 42, the driving portion 43, the support portion 44, the driving portion 45, and the mirror support portion 46 are formed to linearly extend in the direction Y, and the driving portion 51, the support portion 52, the driving portion 53, the support portion 54, the driving portion 55, and the mirror support portion 56 are formed to linearly extend in the direction Y. The driving portion 41 is an example of the "first driving portion" in the present invention, and the driving portion 51 is an example of the "second driving portion" in the present invention. The mirror support portion 46 is an example of the "first mirror support portion" in the present invention, and the mirror support portion 56 is an example of the "second mirror support portion" in the present invention. The support portions 42 and 44 are examples of the "first support portion" in the present invention, and the support portions 52 and 54 are examples of the "second support portion" in the present invention. The driving portions 43 and 45 are examples of the "third driving portion" in the present invention, and the driving portions 53 and 55 are examples of the "fourth driving portion" in the present invention.

According to this embodiment, the driving units 40 and 50 are configured to be substantially point-symmetrical to each other with respect to the center R3 of the mirror 11, as shown in FIG. 2. In other words, the driving portion 51, the support portion 52, the driving portion 53, the support portion 54, the driving portion 55, and the mirror support portion 56 of the driving unit 50 are arranged in such positional relation that the same substantially overlap with the driving portion 41, the support portion 42, the driving portion 43, the support portion 44, the driving portion 45, and the mirror support portion 46, respectively, when rotated by 180° on the center R3 of the mirror 11. The specific arrangement of the driving units 40 and 50 is described later.

Residual stress is accumulated in the driving unit 40 (driving portions 41, 43, and 45) and the driving unit 50 (driving portions 51, 53, and 55). According to this embodiment, the driving units 40 and 50 are substantially point-symmetrical to each other with respect to the center R3 of the mirror 11, whereby the residual stress of the driving unit 40 and the residual stress of the driving unit 50 can offset each other.

The driving portions 41, 43, 45, 51, 53, and 55 each have a length L3 of about 12 mm in the direction Y and a width W1 of about 0.4 mm in the direction X. The support portions 42, 44, 52, and 54 each have a length L3 of about 12 mm in the direction Y and a width W2 of about 0.3 mm in the direction X. The mirror support portions 46 and 56 each have a length L4 of about 3.5 mm in the direction Y and a width W2 of about 0.3 mm in the direction X. The rotation center axis R2 passing through the center R3 of the mirror 11 passes through substantially middle portions of the driving portions 41, 43, 45, 51, 53, and 55 and the support portions 42, 44, 52, and 54 in the direction Y in the non-driven state of the driving portions 41, 43, 45, 51, 53, and 55.

The driving portions 41, 43, 45, 51, 53, and 55 are deformed in warping directions by voltage application to be driven, and are so configured that a voltage applied to the driving portions 41, 43, and 45 and a voltage applied to the driving portions 51, 53, and 55 are opposite in phase to each other.

An end portion 41a of the driving portion 41 of the driving unit 40 on a Y1 side is fixed by an unshown outer frame body. In other words, the driving portion 41 has a cantilever structure having the end portion 41a on the Y1 side serving as a fixed end and an end portion 41b on a Y2 side serving as a free end. Thus, the driving portion 41 is deformed to warp when the same is driven, whereby the end portion 41b is displaced in the direction Z (see FIG. 1) so that the driving portion 41 is inclined. At this time, the end portion 41a that is a fixed end is not displaced even when the driving portion 41 is driven. Thus, a tangent line C1 (see FIG. 3) at the end portion 41b that is a free end is inclined at a first inclination angle with respect to a tangent line C0 (see FIG. 3) at the end portion 41a that is a fixed end. According to this embodiment, the tangent line C0 is located on a horizontal plane.

A connecting portion 41c is provided in the vicinity of the end portion 41b of the driving portion 41 on the Y2 side. On the connecting portion 41c, the driving portion 41 is connected with a connecting portion 42b in the vicinity of an end portion 42a of the support portion 42 on the Y2 side. The support portion 42 is configured to be applied with no voltage and to be substantially unwarped by the absence of a voltage even if the end portion 41b of the driving portion 41 is displaced in the direction Z (see FIG. 1) in a driven state of the driving portion 41. Thus, the support portion 42 is located on the tangent line C1 at the end portion 41b of the driving portion 41 that is a free end in the driven state of the driving portion 41, whereby the support portion 42 is inclined at the first inclination angle with respect to the tangent line C0 at the end portion 41a of the driving portion 41 that is a fixed end. The connecting portion 41c is an example of the "first connecting portion" in the present invention.

Furthermore, a connecting portion 42d is provided in the vicinity of an end portion 42c of the support portion 42 on the Y1 side. On the connecting portion 42d, the support portion 42 is connected with a connecting portion 43b in the vicinity of an end portion 43a of the driving portion 43 on the Y1 side. The support portion 42 is substantially unwarped so that the connecting portion 42d is located on the tangent line C1 (see FIG. 3). Thus, the connecting portion 43b (end portion 43a) of the driving portion 43 connected to the support portion 42 on the connecting portion 42d is located on the tangent line C1, and inclined at the first inclination angle with respect to the tangent line C0 (see FIG. 3). The connecting portion 43b is an example of the "fifth connecting portion" in the present invention.

The driving portion 43 connected to the support portion 42 on the connecting portion 42d is configured to be deformed with reference to the connecting portion 43b (end portion 43a) on the Y1 side. Thus, the driving portion 43 is deformed to warp when the same is driven, whereby an end portion 43c is displaced in the direction Z (see FIG. 1) so that the driving portion 43 is inclined with respect to the support portion 42. Thus, a tangent line C2 (see FIG. 3) at the end portion 43c is inclined at a second inclination angle with respect to the tangent line C1 (see FIG. 3) at the end portion 43a serving as a reference.

A connecting portion 43d is provided in the vicinity of the end portion 43c of the driving portion 43 on the Y2 side. On the connecting portion 43d, the driving portion 43 is connected with a connecting portion 44b in the vicinity of an end portion 44a of the support portion 44 on the Y2 side. The support portion 44 is configured to be applied with no voltage and to be substantially unwarped by the absence of a voltage even if the end portion 43c of the driving portion 43 is displaced in the direction Z (see FIG. 1) in a driven state of the driving portion 43. Thus, the support portion 44 is located on the tangent line C2 at the end portion 43c of the driving portion 43 in the driven state of the driving portion 43, whereby the support portion 44 is inclined at the second inclination angle with respect to the tangent line C1 at the end portion 43a serving as a reference.

Furthermore, a connecting portion 44d is provided in the vicinity of an end portion 44c of the support portion 44 on the Y1 side. On the connecting portion 44d, the support portion 44 is connected with a connecting portion 45b in the vicinity of an end portion 45a of the driving portion 45 on the Y1 side. The support portion 44 is substantially unwarped so that the connecting portion 44d is located on the tangent line C2 (see FIG. 3). Thus, the connecting portion 45b (end portion 45a) of the driving portion 45 connected to the support portion 44 on the connecting portion 44d is located on the tangent line C2, and inclined at the second inclination angle with respect to the tangent line C1 (see FIG. 3). The connecting portion 45b is an example of the "fifth connecting portion" in the present invention.

The driving portion 45 connected to the support portion 44 on the connecting portion 44d is configured to be deformed with reference to the connecting portion 45b (end portion 45a) on the Y1 side. Thus, the driving portion 45 is deformed to warp when the same is driven, whereby an end portion 45c is displaced in the direction Z (see FIG. 1) so that the driving portion 45 is inclined with respect to the support portion 44. Thus, a tangent line C3 (see FIG. 3) at the end portion 45c is inclined at a third inclination angle with respect to the tangent line C2 (see FIG. 3) at the end portion 45a serving as a reference.

A connecting portion 45d is provided in the vicinity of the end portion 45c of the driving portion 45 on the Y2 side. On the connecting portion 45d, the driving portion 45 is connected with a connecting portion 46b in the vicinity of an end portion 46a of the mirror support portion 46 on the Y2 side. The mirror support portion 46 is configured to be applied with no voltage and to be substantially unwarped by the absence of a voltage even if the end portion 45c of the driving portion 45 is displaced in the direction Z (see FIG. 1) in a driven state of the driving portion 45. Thus, the mirror support portion 46 is located on the tangent line C3 at the end portion 45c of the driving portion 45 in the driven state of the driving portion 45, whereby the mirror support portion 46 is inclined at the third inclination angle with respect to the tangent line C2 at the end portion 45a serving as a reference. Consequently, the mirror support portion 46 is configured to be inclined along arrow B1 or B2 (see FIG. 1) at a fourth inclination angle obtained by substantially adding the first inclination angle, the second inclination angle, and the third inclination angle with respect to the tangent line C0 (located on the horizontal plane: see FIG. 3).

On an end portion 46c on the Y1 side, the mirror support portion 46 is connected with the X-directional optical scanning portion 10 in the vicinity of an end portion on the X1 side of the side surface on the Y2 side of the frame body 20 of the X-directional optical scanning portion 10. Thus, in the driving unit 40, adjacent portions are alternately successively bent in the vicinity of the end portions on the Y1 side or the end portions on the Y2 side from the mirror support portion 46 on the X2 side toward the driving portion 41 on the X1 side to be connected to each other, so that portions from the mirror support portion 46 to the driving portion 41 are continuously connected.

As shown in FIG. 2, the end portion 41a of the driving portion 41 on the Y1 side, the end portion 42c of the support portion 42 on the Y1 side, the end portion 43a of the driving portion 43 on the Y1 side, the end portion 44c of the support portion 44 on the Y1 side, and the end portion 45a of the driving portion 45 on the Y1 side are arranged on the Y1 side beyond the side surface of the X-directional optical scanning portion 10 on the Y1 side. The end portion 41b of the driving portion 41 on the Y2 side, the end portion 42a of the support portion 42 on the Y2 side, the end portion 43c of the driving portion 43 on the Y2 side, the end portion 44a of the support portion 44 on the Y2 side, and the end portion 45c of the driving portion 45 on the Y2 side are arranged on the Y2 side beyond the side surface of the X-directional optical scanning portion 10 on the Y2 side.

An end portion 51a of the driving portion 51 of the driving unit 50 on the Y2 side is fixed by the unshown outer frame body. In other words, the driving portion 51 has a cantilever structure having the end portion 51a on the Y2 side serving as a fixed end and an end portion 51b on the Y1 side serving as a free end. Thus, the driving portion 51 is deformed to warp when the same is driven, whereby the end portion 51b is displaced in the direction Z (see FIG. 1) so that the driving portion 51 is inclined. At this time, the end portion 51a that is a fixed end is not displaced even when the driving portion 51 is driven. Thus, a tangent line D1 (see FIG. 3) at the end portion 51b that is a free end is inclined at a fifth inclination angle with respect to a tangent line D0 (see FIG. 3) at the end portion 51a that is a fixed end. According to this embodiment, the tangent line D0 is located on the horizontal plane.

A connecting portion 51c is provided in the vicinity of the end portion 51b of the driving portion 51 on the Y1 side. On the connecting portion 51c, the driving portion 51 is connected with a connecting portion 52b in the vicinity of an end portion 52a of the support portion 52 on the Y1 side. The support portion 52 is configured to be applied with no voltage and to be substantially unwarped by the absence of a voltage even if the end portion 51b of the driving portion 51 is displaced in the direction Z (see FIG. 1) in a driven state of the driving portion 51. Thus, the support portion 52 is located on the tangent line D1 at the end portion 51b of the driving portion 51 that is a free end in the driven state of the driving portion 51, whereby the support portion 52 is inclined at the fifth inclination angle with respect to the tangent line D0 at the end portion 51a of the driving portion 51 that is a fixed end. The connecting portion 51c is an example of the "second connecting portion" in the present invention.

Furthermore, a connecting portion 52d is provided in the vicinity of an end portion 52c of the support portion 52 on the Y2 side. On the connecting portion 52d, the support portion 52 is connected with a connecting portion 53b in the vicinity of an end portion 53a of the driving portion 53 on the Y2 side. The support portion 52 is substantially unwarped so that the connecting portion 52d is located on the tangent line D1 (see FIG. 3). Thus, the connecting portion 53b (end portion 53a) of the driving portion 53 connected to the support portion 52 on the connecting portion 52d is located on the tangent line D1, and inclined at the fifth inclination angle with respect to the tangent line D0 (see FIG. 3). The connecting portion 53b is an example of the "sixth connecting portion" in the present invention.

The driving portion 53 connected to the support portion 52 on the connecting portion 52d is configured to be deformed with reference to the connecting portion 53b (end portion 53a) on the Y2 side. Thus, the driving portion 53 is deformed to warp when the same is driven, whereby an end portion 53c is displaced in the direction Z (see FIG. 1) so that the driving portion 53 is inclined with respect to the support portion 52. Thus, a tangent line D2 (see FIG. 3) at the end portion 53c is inclined at a sixth inclination angle with respect to the tangent line D1 (see FIG. 3) at the end portion 53a serving as a reference.

A connecting portion 53d is provided in the vicinity of the end portion 53c of the driving portion 53 on the Y1 side. On the connecting portion 53d, the driving portion 53 is connected with a connecting portion 54b in the vicinity of an end portion 54a of the support portion 54 on the Y1 side. The support portion 54 is configured to be applied with no voltage and to be substantially unwarped by the absence of a voltage even if the end portion 53c of the driving portion 53 is displaced in the direction Z (see FIG. 1) in a driven state of the driving portion 53. Thus, the support portion 54 is located on the tangent line D2 at the end portion 53c of the driving portion 53 in the driven state of the driving portion 53, whereby the support portion 54 is inclined at the sixth inclination angle with respect to the tangent line D1 at the end portion 53a serving as a reference.

Furthermore, a connecting portion 54d is provided in the vicinity of an end portion 54c of the support portion 54 on the Y2 side. On the connecting portion 54d, the support portion 54 is connected with a connecting portion 55b in the vicinity of an end portion 55a of the driving portion 55 on the Y2 side. The support portion 54 is substantially unwarped so that the connecting portion 54d is located on the tangent line D2 (see FIG. 3). Thus, the connecting portion 55b (end portion 55a) of the driving portion 55 connected to the support portion 54 on the connecting portion 54d is located on the tangent line D2, and inclined at the sixth inclination angle with respect to the tangent line D1 (see FIG. 3). The connecting portion 55b is an example of the "sixth connecting portion" in the present invention.

The driving portion 55 connected to the support portion 54 on the connecting portion 54d is configured to be deformed with reference to the connecting portion 55b (end portion 55a) on the Y2 side. Thus, the driving portion 55 is deformed to warp when the same is driven, whereby an end portion 55c is displaced in the direction Z (see FIG. 1) so that the driving portion 55 is inclined with respect to the support portion 54. Thus, a tangent line D3 (see FIG. 3) at the end portion 55c is inclined at a seventh inclination angle with respect to the tangent line D2 (see FIG. 3) at the end portion 55a serving as a reference.

A connecting portion 55d is provided in the vicinity of the end portion 55c of the driving portion 55 on the Y1 side. On the connecting portion 55d, the driving portion 55 is connected with a connecting portion 56b in the vicinity of an end portion 56a of the mirror support portion 56 on the Y1 side. The mirror support portion 56 is configured to be applied with no voltage and to be substantially unwarped by the absence of a voltage even if the end portion 55c of the driving portion 55 is displaced in the direction Z (see FIG. 1) in a driven state of the driving portion 55. Thus, the mirror support portion 56 is located on the tangent line D3 at the end portion 55c of the driving portion 55 in the driven state of the driving portion 55, whereby the mirror support portion 56 is inclined at the seventh inclination angle with respect to the tangent line D2 at the end portion 55a serving as a reference. Consequently, the mirror support portion 56 is configured to be inclined along arrow B1 or B2 (see FIG. 1) at an eighth inclination angle obtained by substantially adding the fifth inclination angle, the sixth inclination angle, and the seventh inclination angle with respect to the tangent line D0 (located on the horizontal plane: see FIG. 3).

On an end portion 56c on the Y2 side, the mirror support portion 56 is connected with the X-directional optical scanning portion 10 in the vicinity of an end portion on the X2 side of the side surface on the Y1 side of the frame body 20 of the X-directional optical scanning portion 10. Thus, in the driving unit 50, adjacent portions are alternately successively bent in the vicinity of the end portions on the Y1 side or the end portions on the Y2 side from the mirror support portion 56 on the X1 side toward the driving portion 51 on the X2 side to be connected to each other, so that portions from the mirror support portion 56 to the driving portion 51 are continuously connected.

As shown in FIG. 2, the end portion 51a of the driving portion 51 on the Y2 side, the end portion 52c of the support portion 52 on the Y2 side, the end portion 53a of the driving portion 53 on the Y2 side, the end portion 54c of the support portion 54 on the Y2 side, and the end portion 55a of the driving portion 55 on the Y2 side are arranged on the Y2 side beyond the side surface of the X-directional optical scanning portion 10 on the Y2 side. The end portion 51b of the driving portion 51 on the Y1 side, the end portion 52a of the support portion 52 on the Y1 side, the end portion 53c of the driving portion 53 on the Y1 side, the end portion 54a of the support portion 54 on the Y1 side, and the end portion 55c of the driving portion 55 on the Y1 side are arranged on the Y1 side beyond the side surface of the X-directional optical scanning portion 10 on the Y1 side.

In the non-driven state of the driving portions 41, 43, 45, 51, 53, and 55, the X-directional optical scanning portion 10 and the Y-directional optical scanning portion 30 (driving units 40 and 50) are arranged substantially parallel to a plane (horizontal plane) passing through the end portion (fixed end) 41a of the driving portion 41 on the Y1 side and the end portion (fixed end) 51a of the driving portion 51 on the Y2 side.

When the driving portions 41, 43, 45, 51, 53, and 55 are driven while being deformed by voltage application to each of the driving portions 41, 43, 45, 51, 53, and 55, the driving units 40 and 50 are substantially point-symmetrical to each other so that the degrees of the inclinations of the mirror support portions 46 and 56 are substantially equal to each other. Furthermore, the voltage applied to the driving portions 41, 43, and 45 and the voltage applied to the driving portions 51, 53, and 55 are opposite in phase to each other, whereby the fourth inclination angle with respect to the tangent line C0 (located on the horizontal plane) of the mirror support portion 46 and the eighth inclination angle with respect to the tangent line D0 (located on the horizontal plane) of the mirror support portion 56 are symmetrical to each other with respect to the horizontal plane. In other words, the eighth inclination angle with respect to the horizontal plane of the mirror support portion 56 and the fourth inclination angle with respect to the horizontal plane of the mirror support portion 46 are opposite in direction, and substantially the same in magnitude (scalar quantity).

The X-directional optical scanning portion 10 is connected with the mirror support portion 46 in the vicinity of the end portion on the X1 side of the side surface on the Y2 side of the frame body 20 of the X-directional optical scanning portion 10, and connected with the mirror support portion 56 in the vicinity of the end portion on the X2 side of the side surface on the Y1 side of the frame body 20, whereby the side surface on the Y1 side of the frame body 20 is located above (Z1 side) or below (Z2 side) the side surface on the Y2 side so that the X-directional optical scanning portion 10 is inclined in a direction B (see FIG. 1). Consequently, the X-directional optical scanning portion 10 is configured to be supported in an inclined state by the mirror support portions 46 and 56 when the same is located on a plane including the tangent lines C3 and D3. A specific driving operation of the Y-directional optical scanning portion 30 is described later.

Figure 9:
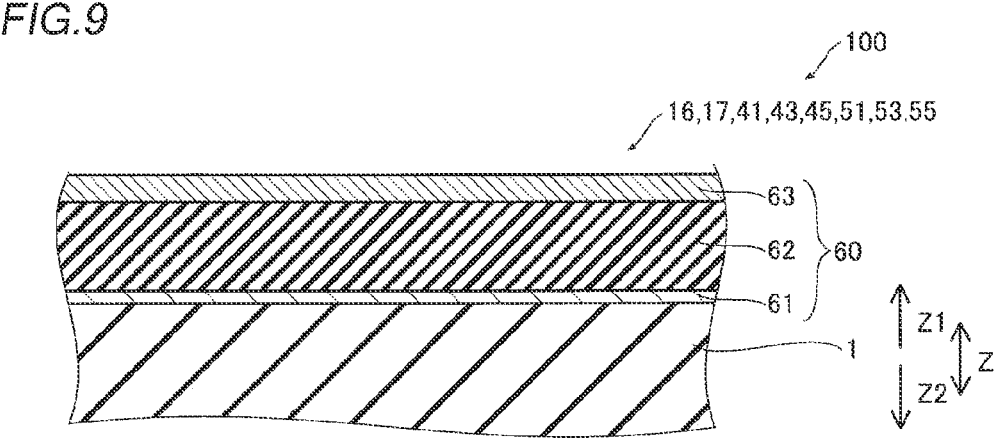
FIG. 9 An enlarged sectional view showing a portion around a piezoelectric actuator of the vibrating mirror element according to the embodiment of the present invention.
Figure 11:
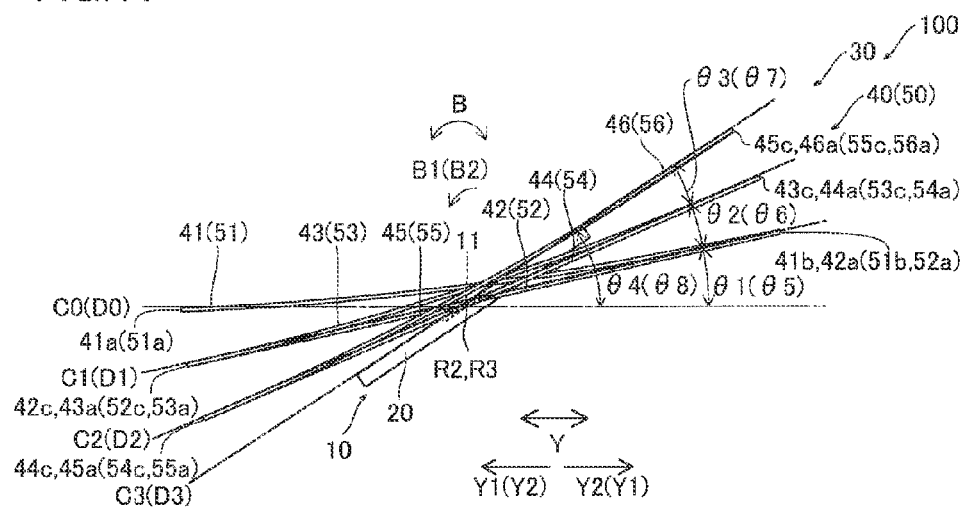
FIG. 11 A side elevational view showing the state where the vibrating mirror element according to the embodiment of the present invention is inclined at the prescribed inclination angle.
Figure 12:
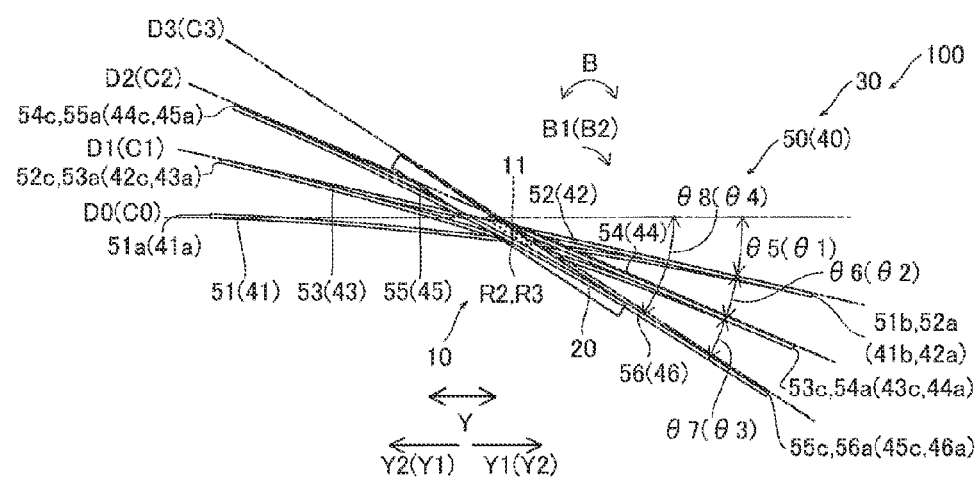
FIG. 12 A side elevational view showing the state where the vibrating mirror element according to the embodiment of the present invention is inclined at the prescribed inclination angle.

As shown in FIGS. 4 and 6 to 8, the inner driving portions 16 and 17 (see FIG. 4) and the driving portions 41, 43, 45, 51, 53, and 55 each have a structure obtained by forming a piezoelectric actuator 60 on the upper surface (surface on the Z1 side) of the Si substrate 1. This piezoelectric actuator 60 has a structure obtained by stacking a lower electrode 61, a piezoelectric body 62, and an upper electrode 63 from the side (Z2 side) closer to the Si substrate 1, as shown in FIG. 9. The lower electrode 61 is made of Ti, Pt, or the like, and formed on the upper surface of the Si substrate 1. Thus, wiring on the lower electrode 61 of the piezoelectric actuator 60 can be performed with respect to an arbitrary portion of the Si substrate 1. The thickness of the piezoelectric actuator 60 is sufficiently small with respect to the Si substrate 1, and hence in FIGS. 3, 11, and 12, illustration of the piezoelectric actuator 60 formed in each of the driving portions 41, 43, 45, 51, 53, and 55 is omitted. Furthermore, the thickness of the lower electrode 61 is sufficiently small, and hence in the drawings other than FIG. 9, illustration of the lower electrode 61 formed on the upper surface of the Si substrate 1 is omitted.

As shown in FIG. 9, the piezoelectric body 62 is made of lead zirconate titanate (PZT), and is so polarized in the thickness direction (direction Z) that the same expands/contracts upon voltage application. The piezoelectric body 62 is also formed on the upper surface of the lower electrode 61 of each of the support portions 42, 44, 52, and 54 (see FIG. 4) and the mirror support portions 46 (see FIG. 6) and 56 (see FIG. 7). As shown in FIG. 2, the piezoelectric body 62 (see FIG. 9) is formed, whereby residual stress is accumulated in the driving unit 40 (driving portions 41, 43, and 45) and the driving unit 50 (driving portions 51, 53, and 55). The thickness of the piezoelectric body 62 is sufficiently small with respect to the Si substrate 1, and hence in FIGS. 3, 11, and 12, illustration of the piezoelectric body 62 formed on the upper surface of each of the support portions 42, 44, 52, and 54 and the mirror support portions 46 and 56 is omitted.

As shown in FIG. 9, the upper electrode 63 is made of a conductive metallic material such as Al, Cr, Cu, Au, or Pt.

Next, the driving operation of the Y-directional optical scanning portion 30 of the vibrating mirror element 100 according to the embodiment of the present invention is described with reference to FIGS. 1, 3, and 9 to 13.

Figure 10:
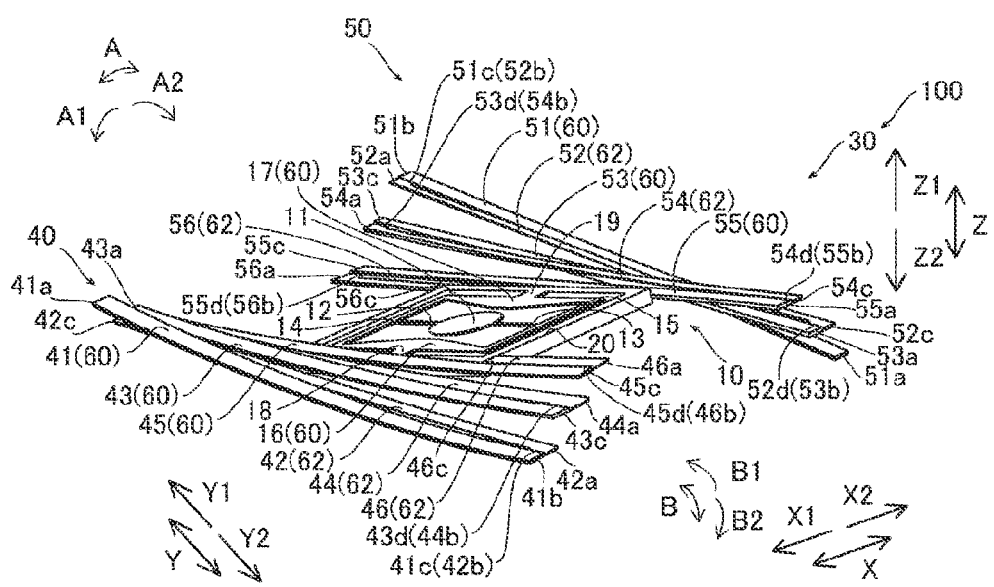
FIG. 10 A perspective view showing a state where the vibrating mirror element according to the embodiment of the present invention is inclined at a prescribed inclination angle along arrow B1.

From the state where the driving portions 41, 43, 45, 51, 53, and 55 are in the non-driven state and are kept horizontal as shown in FIGS. 1 and 3, a voltage for contracting the upper surface side (Z1 side) of the piezoelectric actuators 60 beyond the lower surface side (Z2 side) is applied to the driving portions 41, 43, and 45 of the driving unit 40, as shown in FIG. 10. On the other hand, another voltage, opposite in phase to the voltage applied to the driving portions 41, 43, and 45, for contracting the lower surface side (Z2 side) of the piezoelectric actuators 60 beyond the upper surface side (Z1 side) is applied to the driving portions 51, 53, and 55 of the driving unit 50.

Thus, as shown in FIG. 11, in the driving portions 41, 43, and 45, the end portions 41b, 43c, and 45c on the Y2 side are located above (Z1 side) the end portions 41a, 43a, and 45a on the Y1 side, respectively, whereby the driving portions 41, 43, and 45 are deformed to warp upward. At this time, the end portion 41b of the driving portion 41 is inclined along arrow B1 to have the first inclination angle θ1 on the Z1 side with respect to the tangent line C0. The end portion 43c of the driving portion 43 is inclined along arrow B1 to have the second inclination angle θ2 on the Z1 side with respect to the tangent line C1. The end portion 45c of the driving portion 45 is inclined along arrow B1 to have the third inclination angle θ3 on the Z1 side with respect to the tangent line C2. Consequently, the mirror support portion 46 is inclined along arrow B1 to have the fourth inclination angle θ4 (=θ1+θ2+θ3) obtained by adding the first inclination angle θ1, the second inclination angle θ2, and the third inclination angle θ3 on the Z1 side with respect to the tangent line C0 (located on the horizontal plane).

On the other hand, as shown in FIG. 12, in the driving portions 51, 53, and 55, the end portions 51b, 53c, and 55c on the Y1 side are located below (Z2 side) the end portions 51a, 53a, and 55a on the Y2 side, respectively, whereby the driving portions 51, 53, and 55 are deformed to warp downward. At this time, the end portion 51b of the driving portion 51 is inclined along arrow B1 to have the fifth inclination angle θ5 on the Z2 side with respect to the tangent line D0. The end portion 53c of the driving portion 53 is inclined along arrow B1 to have the sixth inclination angle θ6 on the Z2 side with respect to the tangent line D1. The end portion 55c of the driving portion 55 is inclined along arrow B1 to have the seventh inclination angle θ7 on the Z2 side with respect to the tangent line D2. Consequently, the mirror support portion 56 is inclined along arrow B1 to have the eighth inclination angle θ8 (=θ5+θ6+θ7) obtained by adding the fifth inclination angle θ5, the sixth inclination angle θ6, and the seventh inclination angle θ7 on the Z2 side with respect to the tangent line D0 (located on the horizontal plane).

The first inclination angle θ1 and the fifth inclination angle θ5 are substantially equal to each other, the second inclination angle θ2 and the sixth inclination angle θ6 are substantially equal to each other, and the third inclination angle θ3 and the seventh inclination angle θ7 are substantially equal to each other. Therefore, the fourth inclination angle θ4 (=θ1+θ2+θ3) and the eighth inclination angle θ8 (=θ5+θ6+θ7) are substantially equal to each other.

Consequently, as shown in FIG. 10, the mirror support portion 46 is inclined along arrow B1 while the same maintains the fourth inclination angle θ4 (see FIG. 11) on the Z1 side with respect to the tangent line C0 (see FIG. 11) and itself is unwarped. On the other hand, the mirror support portion 56 is inclined along arrow B1 while the same maintains the eighth inclination angle θ8 (=θ4) (see FIG. 12) on the Z2 side with respect to the tangent line D0 (see FIG. 12) and itself is unwarped. Thus, the X-directional optical scanning portion 10 (mirror 11) supported by the mirror support portion 46 on the X1 side and the Y2 side and supported by the mirror support portion 56 on the X2 side and the Y1 side is inclined along arrow B1 with respect to the horizontal plane including the tangent lines C0 and D0. At this time, the X-directional optical scanning portion 10, the mirror support portion 46, and the mirror support portion 56 are located substantially in the same plane while the same are inclined along arrow B1.

Figure 13:
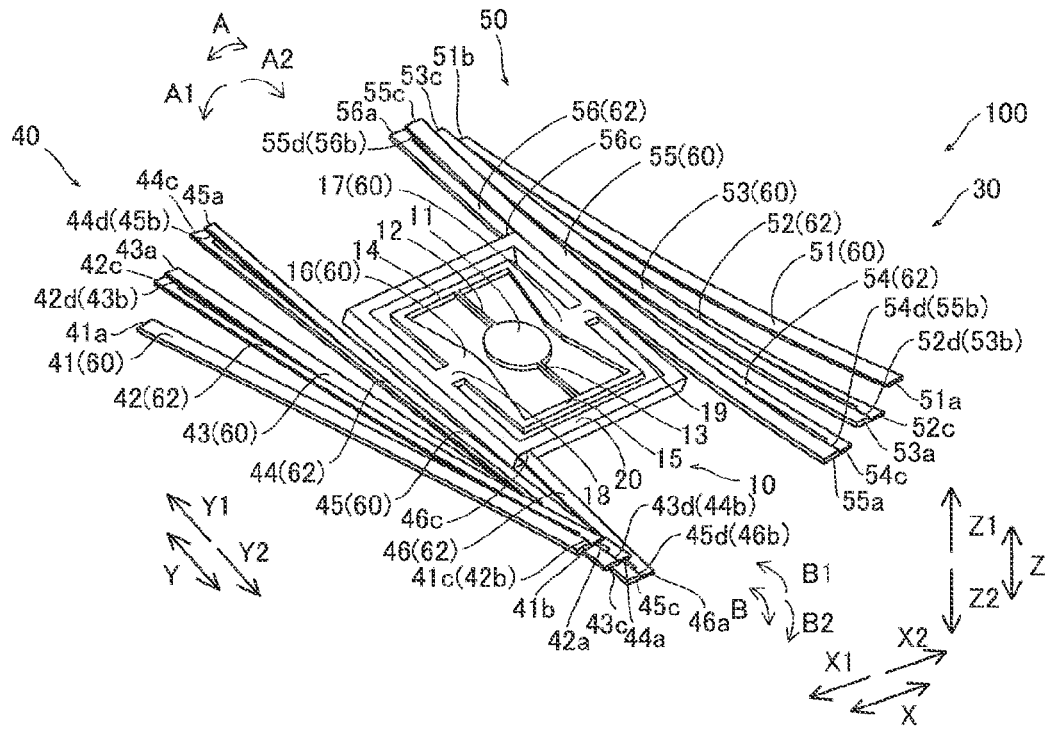
FIG. 13 A perspective view showing a state where the vibrating mirror element according to the embodiment of the present invention is inclined at a prescribed inclination angle along arrow B2.

As shown in FIG. 13, a voltage for contracting the lower surface side (Z2 side) of the piezoelectric actuators 60 beyond the upper surface side (Z1 side) is applied to the driving portions 41, 43, and 45 of the driving unit 40. On the other hand, another voltage, opposite in phase to the voltage applied to the driving portions 41, 43, and 45, for contracting the upper surface side (Z1 side) of the piezoelectric actuators 60 beyond the lower surface side (Z2 side) is applied to the driving portions 51, 53, and 55 of the driving unit 50.

Thus, as shown in FIG. 12, in the driving portions 41, 43, and 45, the end portions 41b, 43c, and 45c on the Y2 side are located below (Z2 side) the end portions 41a, 43a, and 45a on the Y1 side, respectively, whereby the driving portions 41, 43, and 45 are deformed to warp downward. At this time, the end portion 41b of the driving portion 41 is inclined along arrow B2 to have the first inclination angle θ1 on the Z2 side with respect to the tangent line C0. The end portion 43c of the driving portion 43 is inclined along arrow B2 to have the second inclination angle θ2 on the Z2 side with respect to the tangent line C1. The end portion 45c of the driving portion 45 is inclined along arrow B2 to have the third inclination angle θ3 on the Z2 side with respect to the tangent line C2. Consequently, the mirror support portion 46 is inclined along arrow B2 to have the fourth inclination angle θ4 (=θ1+θ2+θ3) obtained by adding the first inclination angle θ1, the second inclination angle θ2, and the third inclination angle θ3 on the Z2 side with respect to the tangent line C0 (located on the horizontal plane).

On the other hand, as shown in FIG. 11, in the driving portions 51, 53, and 55, the end portions 51b, 53c, and 55c on the Y1 side are located above (Z1 side) the end portions 51a, 53a, and 55a on the Y2 side, respectively, whereby the driving portions 51, 53, and 55 are deformed to warp upward. At this time, the end portion 51b of the driving portion 51 is inclined along arrow B2 to have the fifth inclination angle θ5 on the Z1 side with respect to the tangent line D0. The end portion 53c of the driving portion 53 is inclined along arrow B2 to have the sixth inclination angle θ6 on the Z1 side with respect to the tangent line D1. The end portion 55c of the driving portion 55 is inclined along arrow B2 to have the seventh inclination angle θ7 on the Z1 side with respect to the tangent line D2. Consequently, the mirror support portion 56 is inclined along arrow B2 to have the eighth inclination angle θ8 (=θ5+θ6+θ7) obtained by adding the fifth inclination angle θ5, the sixth inclination angle θ6, and the seventh inclination angle θ7 on the Z1 side with respect to the tangent line D0 (located on the horizontal plane). As described above, the fourth inclination angle θ4 and the eighth inclination angle θ8 are substantially equal to each other.

Consequently, as shown in FIG. 13, the mirror support portion 46 is inclined along arrow B2 while the same maintains the fourth inclination angle θ4 (see FIG. 12) on the Z2 side with respect to the tangent line C0 (see FIG. 12) and itself is unwarped. On the other hand, the mirror support portion 56 is inclined along arrow B2 while the same maintains the eighth inclination angle θ8 (=θ4) (see FIG. 11) on the Z1 side with respect to the tangent line D0 (see FIG. 11) and itself is unwarped. Thus, the X-directional optical scanning portion 10 (mirror 11) is inclined along arrow B2 at the inclination angle θ4 with respect to the horizontal plane including the tangent lines C0 and D0. At this time, the X-directional optical scanning portion 10, the mirror support portion 46, and the mirror support portion 56 are located substantially in the same plane while the same are inclined along arrow B2.

Furthermore, a voltage is so applied to the driving portions 41, 43, 45, 51, 53, and 55 of the Y-directional optical scanning portion 30 that the driving portions 41, 43, 45, 51, 53, and 55 nonresonantly drive the mirror 11 to repeat a state where the upper surface side (Z1 side) of the piezoelectric actuators 60 is contracted beyond the lower surface side (Z2 side) and a state where the lower surface side (Z2 side) is contracted beyond the upper surface side (Z1 side) at a frequency of about 60 Hz. Thus, a state where the X-directional optical scanning portion 10 (mirror 11) is inclined along arrow B1 as shown in FIG. 10 and a state where the X-directional optical scanning portion 10 (mirror 11) is inclined along arrow B2 as shown in FIG. 13 are repeated. Thus, the Y-directional optical scanning portion 30 inclines the mirror 11 in the direction B about the rotation center axis R2 and optically scans the object in the unshown direction Y.

Figure 14:
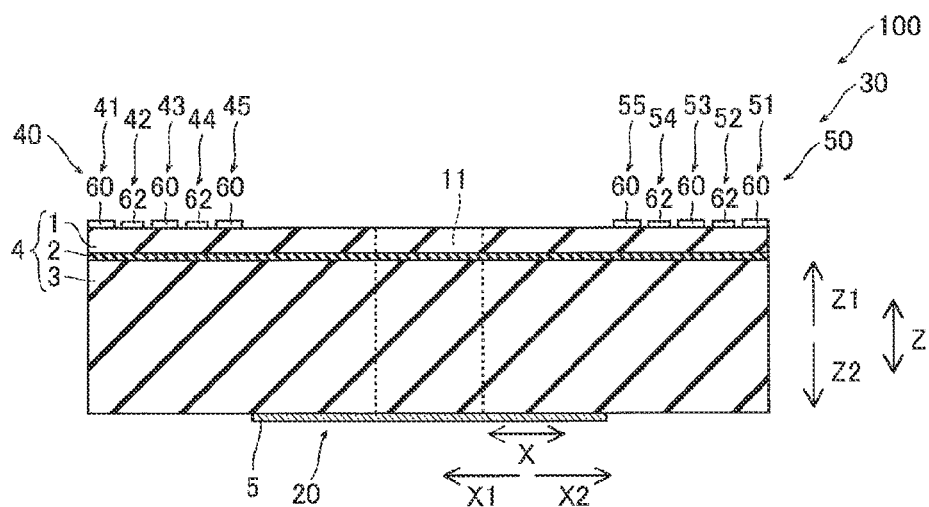
FIG. 14 A sectional view showing a step of manufacturing the vibrating mirror element according to the embodiment of the present invention.
Figure 15:
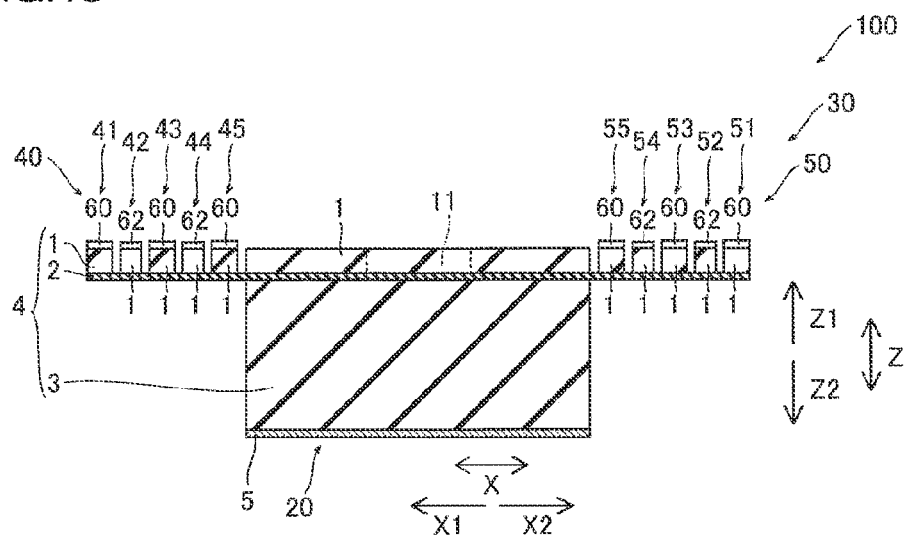
FIG. 15 A sectional view showing a step of manufacturing the vibrating mirror element according to the embodiment of the present invention.

Next, steps of manufacturing the vibrating mirror element 100 according to the embodiment of the present invention are described with reference to FIGS. 8, 9, 14, and 15. FIGS. 14 and 15 are sectional views taken along the line 5000-5000 shown in FIG. 2.

First, an SOI substrates 4 having the Si substrate 1, the $SiO_2$ layer 2 formed on the lower surface (Z2 side) of the Si substrate 1, and the lower Si layer 3 formed on the lower surface of the $SiO_2$ layer 2 is prepared, as shown in FIG. 14. Then, the lower electrodes 61 (see FIG. 9) and the piezoelectric bodies 62 (see FIG. 9) are successively formed on the entire upper surface (surface of the Si substrate 1 on the Z1 side) of the SOI substrate 4 by sputtering or the like. Then, the upper electrodes 63 (see FIG. 9) are formed on the upper surfaces of the piezoelectric bodies 62 corresponding to the inner driving portions 16 and 17 and the driving portions 41, 43, 45, 51, 53, and 55 by vapor deposition or the like. Thus, the piezoelectric actuators 60 are formed in the inner driving portions 16 and 17 and the driving portions 41, 43, 45, 51, 53, and 55.

Then, resist patterns (not shown) are formed in positions corresponding to the inner driving portions 16 and 17, the driving portions 41, 43, 45, 51, 53, and 55, the support portions 42, 44, 52, and 54, and the mirror support portions 46 and 56 by photolithography, and wet etching or the like is thereafter performed through the resist patterns serving as masks, thereby removing portions of the piezoelectric bodies 62 formed in positions other than positions corresponding to the inner driving portions 16 and 17, the driving portions 41, 43, 45, 51, 53, and 55, the support portions 42, 44, 52, and 54, and the mirror support portions 46 and 56. Thereafter, mask patterns 5 made of Al, Cr, Cu, Au, Pt, or the like are formed in positions of the lower surface (surface of the lower Si layer 3 on the Z2 side) of the SOI substrate 4 corresponding to the frame body 20 and the unshown outer frame body by vapor deposition or the like.

Then, a resist pattern (not shown) is formed in a position corresponding to the vibrating mirror element 100 by photolithography and thereafter employed as a mask to remove portions of the lower electrodes 61 (see FIG. 9) formed in positions other than the position corresponding to the vibrating mirror element 100 by wet etching or the like. Thus, the lower electrode 61 is formed only on the upper surface (surface on the Z1 side) of the Si substrate 1 forming the vibrating mirror element 100.

Thereafter, portions of the Si substrate 1 formed in positions other than the position corresponding to the vibrating mirror element 100 are removed by reactive ion etching (RIE) or the like, as shown in FIG. 15. Then, the mask patterns 5 are employed as masks to remove portions of the lower Si layer 3 formed in positions other than positions corresponding to the frame body 20 and the unshown outer frame body by reactive ion etching (RIE) or the like. Thereafter, portions of the SiO$_2$ layer 2 formed in the positions other than the position corresponding to the vibrating mirror element 100 are removed by reactive ion etching (RIE) or the like. Thus, the vibrating mirror element 100 shown in FIG. 8 is formed.

According to this embodiment, as hereinabove described, the driving portion 41, the support portion 42, the driving portion 43, the support portion 44, the driving portion 45, and the mirror support portion 46 of the driving unit 40 and the driving portion 51, the support portion 52, the driving portion 53, the support portion 54, the driving portion 55, and the mirror support portion 56 of the driving unit 50, respectively, are configured to be substantially point-symmetrical to each other with respect to the center R3 of the mirror 11, whereby the X-directional optical scanning portion 10 can be supported by the driving units 40 and 50 that are substantially point-symmetrical to each other in plan view. Thus, the own weight of the X-directional optical scanning portion 10 can be evenly distributed to the mirror support portion 46 and the mirror support portion 56, and hence the X-directional optical scanning portion 10 can be inhibited from inclining in the non-driven state.

According to this embodiment, as hereinabove described, the end portion 41a of the driving portion 41 on the Y1 side, the end portion 42c of the support portion 42 on the Y1 side, the end portion 43a of the driving portion 43 on the Y1 side, the end portion 44c of the support portion 44 on the Y1 side, and the end portion 45a of the driving portion 45 on the Y1 side are arranged on the Y1 side beyond the side surface of the X-directional optical scanning portion 10 on the Y1 side, and the end portion 41b of the driving portion 41 on the Y2 side, the end portion 42a of the support portion 42 on the Y2 side, the end portion 43c of the driving portion 43 on the Y2 side, the end portion 44a of the support portion 44 on the Y2 side, and the end portion 45c of the driving portion 45 on the Y2 side are arranged on the Y2 side beyond the side surface of the X-directional optical scanning portion 10 on the Y2 side, while the end portion 51a of the driving portion 51 on the Y2 side, the end portion 52c of the support portion 52 on the Y2 side, the end portion 53a of the driving portion 53 on the Y2 side, the end portion 54c of the support portion 54 on the Y2 side, and the end portion 55a of the driving portion 55 on the Y2 side are arranged on the Y2 side beyond the side surface of the X-directional optical scanning portion 10 on the Y2 side, and the end portion 51b of the driving portion 51 on the Y1 side, the end portion 52a of the support portion 52 on the Y1 side, the end portion 53c of the driving portion 53 on the Y1 side, the end portion 54a of the support portion 54 on the Y1 side, and the end portion 55c of the driving portion 55 on the Y1 side are arranged on the Y1 side beyond the side surface of the X-directional optical scanning portion 10 on the Y1 side. Thus, the driving portions 41, 43, 45, 51, 53, and 55 can be formed to extend from the Y1 side of the X-directional optical scanning portion 10 (mirror 11) in the direction Y toward the Y2 side thereof. In other words, the driving portions 41, 43, and 45 and the driving portions 51, 53, and 55 can be aligned in the direction (direction X) orthogonal to the direction Y to hold the X-directional optical scanning portion 10 therebetween in the direction X. Thus, the driving portions 41, 43, and 45 and the driving portions 51, 53, and 55 are not arranged on a common straight line extending in the direction Y, and hence the overall size of the vibrating mirror element 100 is not increased in the direction Y by the sum of increases in the lengths of the driving portions 41, 43, 45, 51, 53, and 55 even if the lengths of the driving portions 41, 43, 45, 51, 53, and 55 in the direction Y are increased. Consequently, the size of the vibrating mirror element 100 in the direction Y can be inhibited from increase.

According to this embodiment, as hereinabove described, the driving units 40 and 50 are configured to be substantially point-symmetrical to each other with respect to the center R3 of the mirror 11 so that the residual stress of the driving unit 40 and the residual stress of the driving unit 50 offset each other. Thus, the X-directional optical scanning portion 10 (mirror 11) can be easily inhibited from inclining with respect to the plane (horizontal plane) passing through the end portion (fixed end) 41a of the driving portion 41 on the Y1 side and the end portion (fixed end) 51a of the driving portion 51 on the Y2 side in the non-driven state even if residual stress is accumulated in the driving portions 41, 43, 45, 51, 53, and 55.

According to this embodiment, as hereinabove described, in the non-driven state of the driving portions 41, 43, 45, 51, 53, and 55, the X-directional optical scanning portion 10 and the Y-directional optical scanning portion 30 (driving units 40 and 50) are arranged substantially parallel to the plane (horizontal plane) passing through the end portion (fixed end) 41a of the driving portion 41 on the Y1 side and the end portion (fixed end) 51a of the driving portion 51 on the Y2 side. Thus, the mirror portion can be arranged substantially parallel to the horizontal plane passing through the end portion 41a of the driving portion 41 and the end portion 51a of the driving portion 51 that are not displaced in both of the driven state and the non-driven state of the driving portions 41, 43, 45, 51, 53, and 55, and hence the X-directional optical scanning portion 10 (mirror 11) can be stably inclined.

According to this embodiment, as hereinabove described, the driving portions 41 and 51 are deformed in the warping directions opposite to each other to be driven. Thus, the mirror support portion 46 inclined in response to the deformation of the driving portion 41 and the mirror support portion 56 inclined in response to the deformation of the driving portion 51 can be easily inclined in the same direction, and hence the X-directional optical scanning portion 10 supported by the mirror support portion 46 and the mirror support portion 56 can be easily inclined in a prescribed direction.

According to this embodiment, as hereinabove described, in the driving unit 40, the driving portion 41, the support portion 42, the driving portion 43, the support portion 44, the driving portion 45, and the mirror support portion 46 are arranged in this order from the X1 side along the direction X while in the driving unit 50, the driving portion 51, the support portion 52, the driving portion 53, the support portion 54, the driving portion 55, and the mirror support portion 56 are arranged in this order from the X2 side along the direction X. Thus, the X-directional optical scanning portion 10 (mirror 11) can be inclined to have a larger inclination angle in driving by driving the driving portions 43, 45, 53, and 55 in addition to the driving portions 41 and 51.

According to this embodiment, as hereinabove described, the mirror support portion 46 is inclined along arrow B1 or B2 at the fourth inclination angle obtained by substantially adding the first inclination angle, the second inclination angle, and the third inclination angle with respect to the tangent line C0 (located on the horizontal plane) while the mirror support portion 56 is inclined along arrow B1 or B2 at the eighth inclination angle obtained by substantially adding the fifth inclination angle, the sixth inclination angle, and the seventh inclination angle with respect to the tangent line D0 (located on the horizontal plane). Thus, the mirror support portion 46 can support the X-directional optical scanning portion 10 (mirror 11) in response to the inclination of the connecting portion 41c (end portion 41b) while the mirror support portion 56 can support the X-directional optical scanning portion 10 in response to the inclination of the connecting portion 51c (end portion 51b). Furthermore, the inclination angles of the mirror support portions 46 and 56 can be further increased, and hence the inclination angle of the X-directional optical scanning portion 10 can be further increased.

According to this embodiment, as hereinabove described, the X-directional optical scanning portion 10 is configured to be supported in the inclined state by the mirror support portions 46 and 56 while the same is located on the plane including the tangent lines C3 and D3 when the driving portions 41, 43, 45, 51, 53, and 55 are driven while being deformed. Thus, the X-directional optical scanning portion 10 (mirror 11) can be stably inclined while the inclination of the mirror support portion 46, the inclination of the mirror support portion 56, and the inclination of the X-directional optical scanning portion 10 are maintained to be substantially the same as each other.

According to this embodiment, as hereinabove described, the voltage applied to the driving portions 41, 43, and 45 and the voltage applied to the driving portions 51, 53, and 55 are opposite in phase to each other, whereby the driving portions 41, 43, and 45 and the driving portions 51, 53, and 55 can be easily deformed to warp in directions different from each other. Thus, the end portion 41b of the driving portion 41 and the end portion 51b of the driving portion 51 can be displaced to the same extent in directions opposite to each other with reference to positions in the non-driven state, the end portion 43c of the driving portion 43 and the end portion 53c of the driving portion 53 can be displaced to the same extent in directions opposite to each other with reference to positions in the non-driven state, and the end portion 45c of the driving portion 45 and the end portion 55c of the driving portion 55 can be displaced to the same extent in directions opposite to each other with reference to positions in the non-driven state. Thus, the mirror support portion 46 and the mirror support portion 56 that is substantially point-symmetrical to the mirror support portion 46 can be inclined at substantially the same inclination angle ($\theta 4=\theta 8$). Consequently, the X-directional optical scanning portion 10 (mirror 11) supported by the mirror support portions 46 and 56 can be inclined in the direction B.

According to this embodiment, as hereinabove described, in the driving unit 40, the adjacent portions are alternately successively bent on the Y1 side or the Y2 side from the mirror support portion 46 on the X2 side toward the driving portion 41 on the X1 side to be connected to each other so that the portions from the mirror support portion 46 to the driving portion 41 are continuously connected, while in the driving unit 50, the adjacent portions are alternately successively bent on the Y1 side or the Y2 side from the mirror support portion 56 on the X1 side toward the driving portion 51 on the X2 side to be connected to each other so that the portions from the mirror support portion 56 to the driving portion 51 are continuously connected. Thus, the driving portion 43 can be driven on the basis of the displacement of the end portion 41b (connecting portion 41c) of the driving portion 41 while the driving portion 45 can be driven on the basis of the displacement of the end portion 43c (connecting portion 43d) of the driving portion 43. Furthermore, the driving portion 53 can be driven on the basis of the displacement of the end portion 51b (connecting portion 51c) of the driving portion 51 while the driving portion 55 can be driven on the basis of the displacement of the end portion 53c (connecting portion 53d) of the driving portion 53. Thus, the inclination angles of the mirror support portions 46 and 56 can be further increased, and hence the inclination angle of the X-directional optical scanning portion 10 (mirror 11) can be further increased.

According to this embodiment, as hereinabove described, the X-directional optical scanning portion 10 is provided with the mirror 11 and the inner driving portions 16 and 17 rotating the mirror 11 about the rotation center axis R1. Thus, the mirror 11 can accurately reflect light about the rotation center R2, and the vibrating mirror element 100 can two-dimensionally optically scan the object by the rotation about the rotation center R1 and the rotation about the rotation center axis R2.

According to this embodiment, as hereinabove described, the X-directional optical scanning portion 10 is configured to resonantly drive the mirror 11 at the resonance frequency of about 30 kHz while the Y-directional optical scanning portion 30 is configured to nonresonantly drive the mirror 11 at the frequency of about 60 Hz. Thus, the vibrating mirror element 100 can two-dimensionally optically scan the object while the X-directional optical scanning portion 10 is configured to rotate at a larger frequency about the rotation center axis R1 than about the rotation center axis R2.

According to this embodiment, the rotation center axis R2 passes through the middle portions of the driving portions 41 and 51 in the direction Y in the non-driven state of the driving portions 41 and 51, whereby the driving portions 41 and 51 can be driven in the direction Y in a balanced manner.

According to this embodiment, the driving portions 16 and 17 are provided to hold the mirror therebetween in the direction X, and formed to protrude toward the mirror 11 in the vicinity of the rotation center axis R2, whereby the width of each of the driving portions 16 and 17 in the vicinity of the rotation center axis R2 is increased, and hence the mechanical strength of each of the driving portions 16 and 17 deformed in driving can be increased.

According to this embodiment, the X-directional optical scanning portion 10 is provided with the frame body 20 supported by the mirror support portions 46 and 56, and the frame body 20 is configured to have the thickness larger than the thicknesses of other portions of the X-directional optical scanning portion 10, whereby the frame body 20 can be inhibited from twisting. Consequently, the X-directional optical scanning portion 10 can be inclined at a prescribed inclination angle in a stable state.

According to this embodiment, as hereinabove described, the driving units 40 and 50 (Y-directional optical scanning portion 30) and the X-directional optical scanning portion 10 are integrally formed on the common Si substrate 1, whereby no connection between the driving units 40 and 50 (Y-directional optical scanning portion 30) and the X-directional optical scanning portion 10 may be made separately, and hence the steps of manufacturing the vibrating mirror element 100 can be simplified.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are included.

Figure 16:
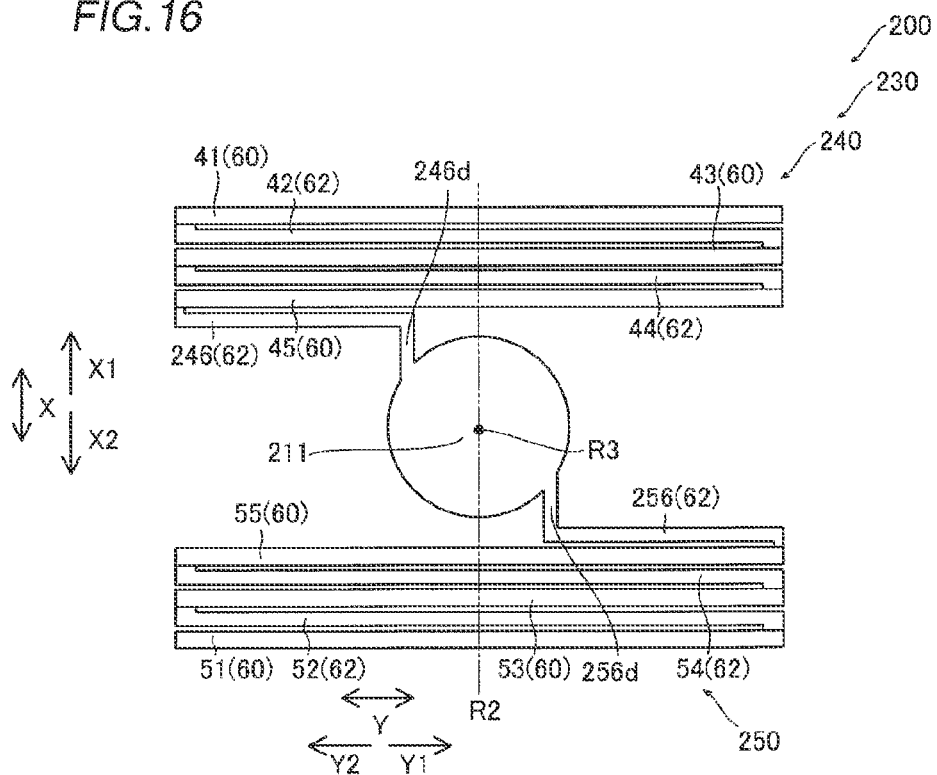
FIG. 16 A plan view showing the structure of a vibrating mirror element according to a first modification of the embodiment of the present invention.

For example, while the example in which the vibrating mirror element 100 includes the X-directional optical scanning portion 10 and the Y-directional optical scanning portion 30 and rotates the mirror 11 in the direction A and the direction B (two-dimensionally) has been shown in the aforementioned embodiment, the present invention is not restricted to this. For example, no X-directional optical scanning portion but a Y-directional optical scanning portion 230 and a mirror 211 may be provided to rotate the mirror 211 only in the direction B (see FIG. 1) (one-dimensionally) according to this embodiment, as in a vibrating mirror element 200 according to a first modification shown in FIG. 16. In this case, the mirror 211 is connected with an end portion 246d on a Y1 side of a mirror support portion 246 of a driving unit 240 on an X1 side and a Y2 side, and connected with an end portion 256d on the Y2 side of a mirror support portion 256 of a driving unit 250 on an X2 side and the Y1 side. Thus, the mirror 211 can be inclined in the direction B. Furthermore, the driving units 240 and 250 are point-symmetrical to each other with respect to the center R3 of the mirror 211. The mirror 211 is an example of the "mirror portion" in the present invention.

Figure 17:
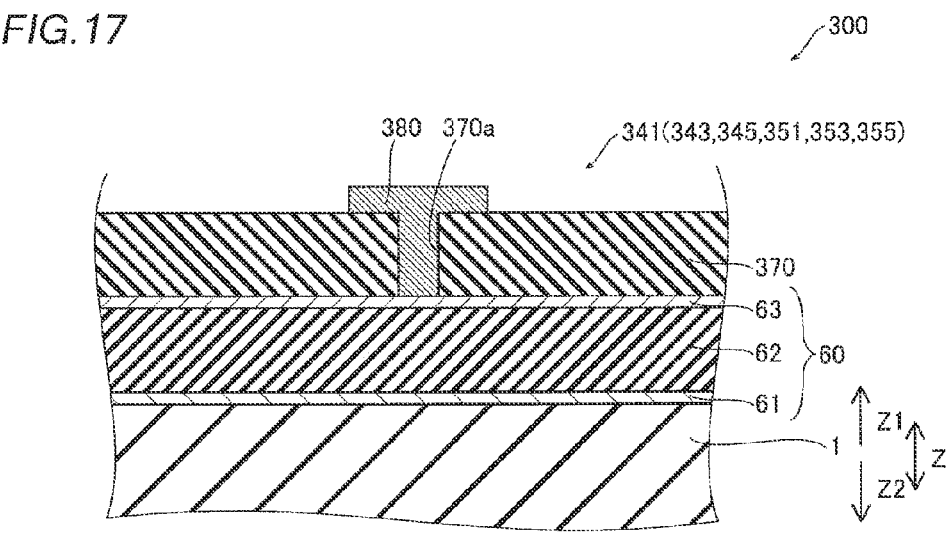
FIG. 17 An enlarged sectional view showing the structure of a driving portion of a Y-directional optical scanning portion of a vibrating mirror element according to a second modification of the embodiment of the present invention.
Figure 18:
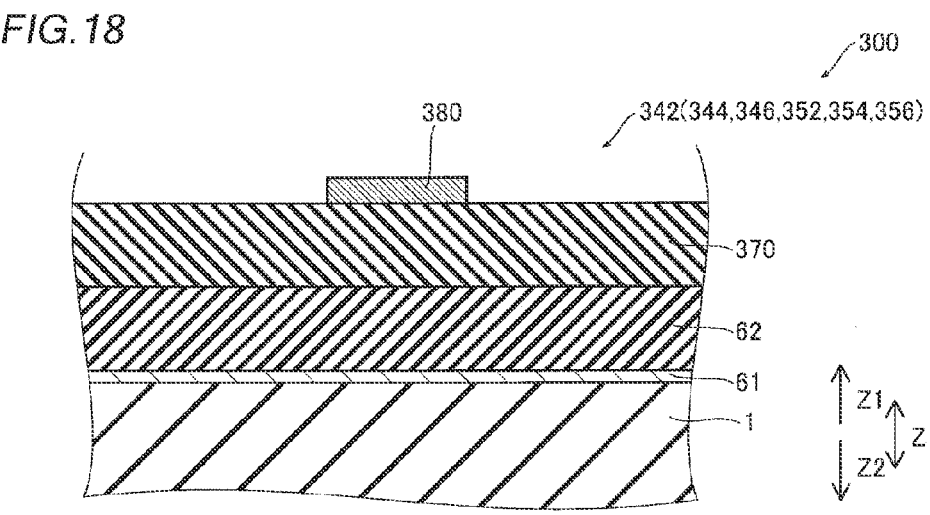
FIG. 18 An enlarged sectional view showing the structure of a support portion or a mirror support portion of the Y-directional optical scanning portion of the vibrating mirror element according to the second modification of the embodiment of the present invention.
Figure 19:
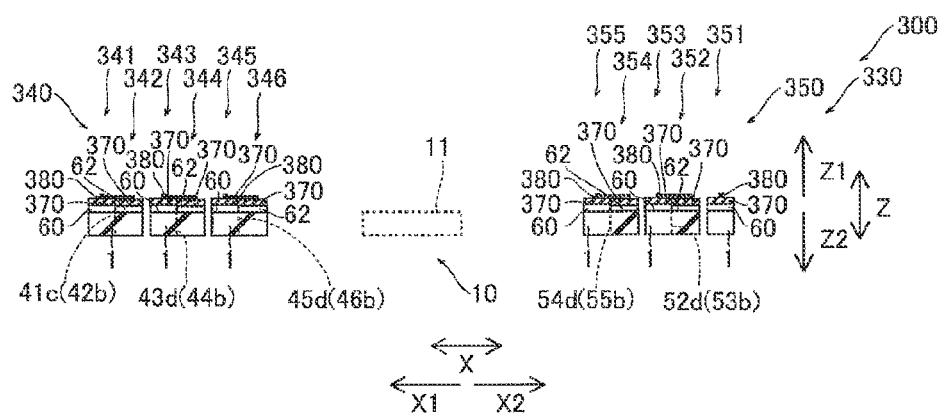
FIG. 19 A sectional view showing connecting portions on a Y2 side of the vibrating mirror element according to the second modification of the embodiment of the present invention.
Figure 20:
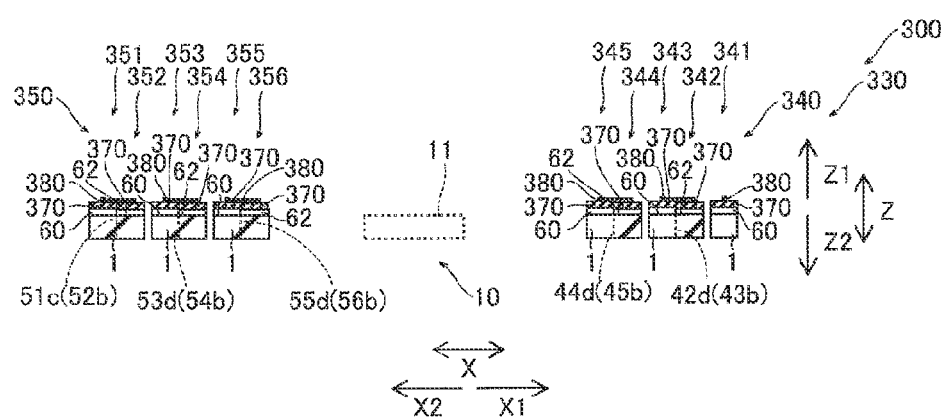
FIG. 20 A sectional view showing connecting portions on a Y1 side of the vibrating mirror element according to the second modification of the embodiment of the present invention.

While the example in which the driving portions 41, 43, 45, 51, 53, and 55 each have the structure obtained by forming the piezoelectric actuator 60 on the upper surface (surface on the Z1 side) of the Si substrate 1 has been shown in the aforementioned embodiment, insulating layers 370 and wiring portions 380 may be further formed on the upper surfaces of piezoelectric actuators 60 formed in driving portions 341, 343, 345, 351, 353, and 355 to extend in the direction Y (see FIG. 1), and contact holes 370a may be formed in the insulating layers 370, as in a vibrating mirror element 300 according to a second modification shown in FIG. 17. Thus, upper electrodes 63 of the piezoelectric actuators 60 and the wiring portions 380 can be connected to each other through the contact holes 370a, and hence a voltage can be easily applied to the upper electrodes 63 of the piezoelectric actuators 60 of the driving portions 341, 343, 345, 351, 353, and 355 through the wiring portions 380 and the contact holes 370a. Furthermore, in the vibrating mirror element 300 according to the second modification, the insulating layers 370 and the wiring portions 380 are further formed on the upper surfaces of piezoelectric bodies 62 arranged on the upper surfaces of support portions 342, 344, 352, and 354 and mirror support portions 346 and 356, as shown in FIG. 18. As shown in FIGS. 19 and 20, the wiring portions 380 may be connected to each other on connecting portions (connecting portions 41c, 42b, 42d, 43b, 43d, 44b, 44d, 45b, 45d, 46b, 51c, 52b, 52d, 53b, 53d, 54b, 54d, 55b, 55d, 56b) between the adjacent driving portions and support portions or mirror support portions.

According to this structure, the same voltage can be easily applied to the driving portions 341, 343, and 345 of a driving unit 340 while the same voltage can be easily applied to the driving portions 351, 353, and 355 of a driving unit 350. Furthermore, an inner driving portion 16 (see FIG. 1) and the wiring portion 380 of the mirror support portion 346 are connected to each other, whereby a voltage can be easily applied to the inner driving portion 16 while an inner driving portion 17 (see FIG. 1) and the wiring portion 380 of the mirror support portion 356 are connected to each other, whereby a voltage can be easily applied to the inner driving portion 17. The piezoelectric actuators 60 are examples of the "driving section" in the present invention, and the upper electrodes 63 are examples of the "electrode" in the present invention.

While the example of providing the two first support portions (support portions 42 and 44) and the two third driving portions (driving portions 43 and 45) between the driving portion 41 (first driving portion) and the mirror support portion 46 (first mirror support portion) of the driving unit 40 and providing the two second support portions (support portions 52 and 54) and the two fourth driving portions (driving portions 53 and 55) between the driving portion 51 (second driving portion) and the mirror support portion 56 (second mirror support portion) of the driving unit 50 has been shown in the aforementioned embodiment, the present invention is not restricted to this. According to the present invention, not more than one or at least three first support portions and not more than one or at least three third driving portions may be provided between the first driving portion and the first mirror support portion, or not more than one or at least three second support portions and not more than one or at least three fourth driving portions may be provided between the second driving portion and the second mirror support portion. In this case, the second support portions must be provided to be point-symmetrical to the first support portions with respect to the center of the mirror portion, and the fourth driving portions must be provided to be point-symmetrical to the third driving portions with respect to the center of the mirror portion.

While the example of providing the connecting portion 41c in the vicinity of the end portion 41b of the driving portion 41 on the Y2 side and providing the connecting portion 51c in the vicinity of the end portion 51b of the driving portion 51 on the Y1 side has been shown in the aforementioned embodiment, the present invention is not restricted to this. According to the present invention, no connecting portion may be provided in the vicinity of the end portion of the driving portion so far as a connecting portion is provided on the side of the free end of the driving portion.

While the example in which the piezoelectric body 62 is made of lead zirconate titanate (PZT) has been shown in the aforementioned embodiment, the present invention is not restricted to this. For example, the piezoelectric body may be made of a piezoelectric material, other than PZT, consisting of an oxide mainly composed of lead, titanium and/or zirconium or another piezoelectric material. More specifically, the piezoelectric body may be made of a piezoelectric material such as zinc oxide (ZnO), lead lanthanate zirconate titanate ((Pb,La) (Zr,Ti)O$_3$), potassium niobate (KNbO$_3$), or sodium niobate (NaNbO$_3$).

While the example of accumulating residual stress in the driving unit 40 (driving portions 41, 43, and 45) and the driving unit 50 (driving portions 51, 53, and 55) has been shown in the aforementioned embodiment, the present invention is not restricted to this. According to the present invention, no residual stress may be accumulated in the first driving portion, the second driving portion, the third driving portion, and the fourth driving portion.

While the example of continuously connecting the portions from the mirror support portion 46 to the driving portion 41 in the driving unit 40 and continuously connecting the portions from the mirror support portion 56 to the driving portion 51 in the driving unit 50 has been shown in the aforementioned embodiment, the present invention is not restricted to this. According to the present invention, the portions from the first (second) mirror support portion to the first (second) driving portion may not be continuously connected. In this case, a pair of the driving units must be point-symmetrical to each other with respect to the center of the mirror portion, and the first (second) driving portion must be cantilevered.

While the example of providing the two first support portions (support portions 42 and 44) and the two third driving portions (driving portions 43 and 45) in the driving unit 40 and providing the two second support portions (support portions 52 and 54) and the two fourth driving portions (driving portions 53 and 55) in the driving unit 50 has been shown in the aforementioned embodiment, the present invention is not restricted to this. According to the present invention, the number of the first (second) support portions and the number of the third (fourth) driving portions provided in the driving unit may be different from each other. In this case, the second support portions and the fourth driving portions that are formed must be point-symmetrical to the first support portions and the third driving portions, respectively, with respect to the center of the mirror portion.

While the example in which the first inclination angle $\theta 1$ and the fifth inclination angle $\theta 5$ are equal to each other, the second inclination angle $\theta 2$ and the sixth inclination angle $\theta 6$ are equal to each other, and the third inclination angle $\theta 3$ and the seventh inclination angle $\theta 7$ are equal to each other so that the fourth inclination angle $\theta 4$ $(=\theta 1+\theta 2+\theta 3)$ and the eighth inclination angle $\theta 8$ $(=\theta 5+\theta 6+\theta 7)$ are equal to each other has been shown in the aforementioned embodiment, the present invention is not restricted to this. According to the present invention, the first inclination angle $\theta 1$ and the fifth inclination angle $\theta 5$ may not be equal to each other, the second inclination angle $\theta 2$ and the sixth inclination angle $\theta 6$ may not be equal to each other, and the third inclination angle $\theta 3$ and the seventh inclination angle $\theta 7$ may not be equal to each other, so far as the fourth inclination angle $\theta 4$ and the eighth inclination angle $\theta 8$ are equal to each other.

While the example in which the Y-directional optical scanning portion 30 is configured to nonresonantly drive the mirror 11 at the frequency of about 60 Hz has been shown in the aforementioned embodiment, the present invention is not restricted to this. According to the present invention, the Y-directional optical scanning portion may be configured to resonantly drive the mirror. Preferably, the Y-directional optical scanning portion nonresonantly drives the mirror at a frequency of at least about 30 Hz and not more than about 120 Hz.

While the example of integrally forming the driving units 40 and 50 (Y-directional optical scanning portion 30) and the X-directional optical scanning portion 10 on the common Si substrate 1 has been shown in the aforementioned embodiment, the present invention is not restricted to this. According to the present invention, the Y-directional optical scanning portion and the X-directional optical scanning portion may not be integrally formed, or the driving portions, the support portions, and the mirror support portions of the driving units may not be integrally formed. For example, the Y-directional optical scanning portion may be formed by preparing the driving portions, the support portions, and the mirror support portions separately, and thereafter bonding the same to each other.

While the example in which the inner driving portions 16 and 17 and the driving portions 41, 43, 45, 51, 53, and 55 include the piezoelectric actuators 60 each having the structure obtained by stacking the lower electrode 61, the piezoelectric body 62, and the upper electrode 63 has been shown in the aforementioned embodiment, the present invention is not restricted to this. According to the present invention, the inner driving portions and the driving portions may be configured to be driven by drivers other than the piezoelectric actuators. For example, the inner driving portions and the driving portions may be driven by drivers, made of an elastomer, held between electrodes. In this case, a voltage is so applied between the electrodes that the electrodes attract each other thereby compressing the elastomer and deforming the drivers.

The invention claimed is:

1. A vibrating mirror element (100, 200, 300) comprising:
    a mirror portion (10);
    a deformable first driving portion (41, 341), being cantilevered, including a first fixed end (41*a*) formed on a first side of a first direction beyond a first end portion of said mirror portion on said first side of said first direction and a first free end (41*b*) formed on a second side of said first direction beyond a second end portion of said mirror portion on said second side of said first direction, and linearly extending along said first direction;
    a first mirror support portion (46, 246, 346) capable of supporting said mirror portion in a state where said mirror portion is inclined in response to an inclination of said first free end in driving;
    a deformable second driving portion (51, 351), being cantilevered, including a second fixed end (51*a*) formed on said second side of said first direction beyond said second end portion of said mirror portion on said second side of said first direction and a second free end (51*b*) formed on said first side of said first direction beyond said first end portion of said mirror portion on said first side of said first direction, being point-symmetrical to said first driving portion with respect to a center of said mirror portion, and linearly extending along said first direction; and
    a second mirror support portion (56, 256, 356) being point-symmetrical to said first mirror support portion with respect to said center of said mirror portion and capable of supporting said mirror portion in a state where said mirror portion is inclined in response to an inclination of said second free end in driving.

2. The vibrating mirror element according to claim 1, wherein
    residual stress is accumulated in said first driving portion and said second driving portion, and
    residual stress of said first driving portion and residual stress of said second driving portion being point-symmetrical to said first driving portion with respect to said center of said mirror portion offset each other, so that said mirror portion is arranged parallel to a plane passing through said first fixed end of said first driving portion and said second fixed end of said second driving portion in a non-driven state of said first driving portion and said second driving portion.

3. The vibrating mirror element according to claim 1, wherein
    said first driving portion further includes a first connecting portion (41*c*) formed on a side of said first free end, said second driving portion further includes a second connecting portion (51*c*) formed on a side of said second free end, and said first mirror support portion is configured to be capable of supporting said mirror portion in a state where said mirror portion is inclined in response to an inclination of said first connecting portion while said second mirror support portion is configured to be capable of supporting said mirror portion in a state where said mirror portion is inclined in response to an inclination of said second connecting portion.

4. The vibrating mirror element according to claim 1, wherein said first mirror support portion, said second mirror support portion, and said mirror portion are configured to be located on the same plane in an inclined state when said first driving portion and said second driving portion are driven while being deformed.

5. The vibrating mirror element according to claim 1, wherein said first driving portion and said second driving portion are configured to be deformed in warping directions opposite to each other to be driven.

6. The vibrating mirror element according to claim 1, wherein said first driving portion and said second driving portion are configured to be driven by voltage application, and voltages opposite in phase to each other are applied to said first driving portion and said second driving portion.

7. The vibrating mirror element according to claim 1, further comprising:

at least one deformable third driving portion (43, 45, 343, 345) arranged between said first driving portion and said first mirror support portion and linearly extending along said first direction;

an inclinable first support portion (42, 44, 342, 344), the number of which is equal to the number of said third driving portions, arranged between said first driving portion and said first mirror support portion and linearly extending along said first direction;

a deformable fourth driving portion (53, 55, 353, 355) being point-symmetrical to said third driving portion with respect to said center of said mirror portion, arranged between said second driving portion and said second mirror support portion, and linearly extending along said first direction; and an inclinable second support portion (52, 54, 352, 354) being point-symmetrical to said first support portion with respect to said center of said mirror portion, arranged between said second driving portion and said second mirror support portion, and linearly extending along said first direction.

8. The vibrating mirror element according to claim 7, wherein said first mirror support portion, said second mirror support portion, said first support portion, and said second support portion are configured to be applied with no voltage and to be unwarped by the absence of a voltage.

9. The vibrating mirror element according to claim 7, wherein said first driving portion, said second driving portion, said third driving portion, and said fourth driving portion are configured to be driven by voltage application, and a voltage applied to said first driving portion and said third driving portion and a voltage applied to said second driving portion and said fourth driving portion are opposite in phase to each other.

10. The vibrating mirror element according to claim 7, wherein said third driving portion and said first support portion are connected to each other by alternately successively bending adjacent portions on either said first side of said first direction or said second side thereof in a state where said third driving portion and said first support portion are alternately arranged from a side of said first mirror support portion toward a side of said first driving portion along a second direction orthogonal to said first direction, so that portions from said first mirror support portion to said first driving portion are continuously connected, and said fourth driving portion and said second support portion are connected to each other by alternately successively bending adjacent portions on either said first side of said first direction or said second side thereof in a state where said fourth driving portion and said second support portion are alternately arranged from a side of said second mirror support portion toward a side of said second driving portion along said second direction, so that portions from said second mirror support portion to said second driving portion are continuously connected.

11. The vibrating mirror element according to claim 10, wherein said first driving portion further includes a first connecting portion (41*c*) formed on a side of said first free end, said second driving portion further includes a second connecting portion (51*c*) formed on a side of said second free end, said third driving portion includes a third connecting portion (43*d*, 45*d*) connected with said first support portion or said first mirror support portion adjacent thereto on a side closer to said mirror portion in said second direction, said fourth driving portion includes a fourth connecting portion (53*d*, 55*d*) connected with said second support portion or said second mirror support portion adjacent thereto on a side closer to said mirror portion in said second direction, said first driving portion is configured to be connected with said first support portion adjacent thereto on said first connecting portion while said second driving portion is configured to be connected with said second support portion adjacent thereto on said second connecting portion, an inclination angle of said first mirror support portion with respect to a tangent line of said first fixed end of said first driving portion is a sum of an inclination angle of said first connecting portion with respect to said tangent line of said first fixed end of said first driving portion and an inclination angle of said third connecting portion of said third driving portion with respect to said first support portion adjacently located on a side closer to said first driving portion in said second direction, and an inclination angle of said second mirror support portion with respect to a tangent line of said second fixed end of said second driving portion is a sum of an inclination angle of said second connecting portion with respect to said tangent line of said second fixed end of said second driving portion and an inclination angle of said fourth connecting portion of said fourth driving portion with respect to said second support portion adjacently located on a side closer to said second driving portion in said second direction.

12. The vibrating mirror element according to claim 11, wherein said third driving portion includes a fifth connecting portion (43*b*, 45*b*) connected with said first support portion adjacent thereto on said side closer to said first driving portion in said second direction, said fourth driving portion includes a sixth connecting portion (53*b*, 55*b*) connected with said second support portion adjacent thereto on said side closer to said second driving portion in said second direction, when said third driving portion is applied with a voltage to be driven, said first support portion is undeformed, and said third driving portion is deformed with reference to said fifth connecting portion, and when said fourth driving portion is applied with a voltage to be driven, said second support portion is undeformed, and said fourth driving portion is deformed with reference to said sixth connecting portion.

13. The vibrating mirror element according to claim 11, wherein said inclination angle of said first connecting portion with respect to said tangent line of said first fixed end of said first driving portion is equal to said inclination angle of said second connecting portion with respect to said tangent line of said second fixed end of said second driving portion, and said inclination angle of said third connecting portion of said third driving portion with respect to said first support portion adjacently located on said side closer to said first driving portion in said second direction is equal to said inclination angle of said fourth connecting portion of said fourth driving portion with respect to said second support portion adjacently located on said side closer to said second driving portion in said second direction.

14. The vibrating mirror element according to claim 1, wherein said mirror portion is configured to rotate about a first rotation center axis, and said mirror portion includes a mirror and a fifth driving portion (16, 17) rotating said mirror about a second rotation center axis orthogonal to said first rotation center axis in an in-plane direction of said mirror.

15. The vibrating mirror element according to claim 14, wherein said first driving portion and said second driving portion are configured to rotate said mirror portion about said first rotation center axis on the basis of a first frequency, and said fifth driving portion is configured to rotate said mirror about said second rotation center axis on the basis of a second frequency larger than said first frequency.

16. The vibrating mirror element according to claim 14, wherein said first rotation center axis passes through middle portions of said first driving portion and said second driving portion in said first direction in a non-driven state of said first driving portion and said second driving portion.

17. The vibrating mirror element according to claim 14, wherein a pair of said fifth driving portions are provided to hold said mirror therebetween in a second direction orthogonal to said first direction, and formed to protrude toward said mirror in the vicinity of said first rotation center axis.

18. The vibrating mirror element according to claim 14, wherein said mirror portion includes a frame body (20) supported by said first mirror support portion and said second mirror support portion, and said frame body has a thickness larger than thicknesses of other portions of said mirror portion.

19. The vibrating mirror element according to claim 1, wherein said first driving portion, said first mirror support portion, said second driving portion, said second mirror support portion, and said mirror portion are integrally formed.

20. The vibrating mirror element according to claim 1, wherein each of said first driving portion and said second driving portion further includes a driving section (60) having an electrode (63), an insulating layer (370) formed on a surface of said driving section and having a contact hole (370*a*), and a wiring portion (380) formed to extend on a surface of said insulating layer and connected with said electrode of said driving section through said contact hole.

\* \* \* \* \*